US012654515B2

(12) United States Patent
Then et al.

(10) Patent No.: US 12,654,515 B2
(45) Date of Patent: Jun. 16, 2026

(54) MODULAR ASSEMBLY FOR A REFRIGERANT CIRCUIT OF A MOTOR VEHICLE, AND REFRIGERANT CIRCUIT

(71) Applicants: AUDI AG, Ingolstadt (DE); MAHLE INTERNATIONAL GMBH, Stuttgart (DE)

(72) Inventors: Patrick Then, Ingolstadt (DE); Thomas Haltmeier, Elsendorf (DE); Bernhard Danner, Ingolstadt (DE); Christian Rebinger, Munich (DE); Dominik Behnert, Leonberg (DE); Timo Feldkeller, Asperg (DE); Tobias Isermeyer, Löwenstein (DE)

(73) Assignees: AUDI AG, Ingolstadt (DE); MAHLE INTERNATIONAL GMBH, Stuttgart (DE)

( * ) Notice: Subject to any disclaimer, the term of this patent is extended or adjusted under 35 U.S.C. 154(b) by 119 days.

(21) Appl. No.: 18/291,253

(22) PCT Filed: Aug. 4, 2022

(86) PCT No.: PCT/EP2022/071980
§ 371 (c)(1),
(2) Date: Jan. 23, 2024

(87) PCT Pub. No.: WO2023/020855
PCT Pub. Date: Feb. 23, 2023

(65) Prior Publication Data
US 2024/0375487 A1 Nov. 14, 2024

(30) Foreign Application Priority Data
Aug. 16, 2021 (DE) ..................... 10 2021 121 252.9

(51) Int. Cl.
B60H 1/32 (2006.01)
B60H 1/00 (2006.01)
F25B 40/00 (2006.01)

(52) U.S. Cl.
CPC ....... B60H 1/3229 (2013.01); B60H 1/00342 (2013.01); B60H 1/3227 (2013.01);
(Continued)

(58) Field of Classification Search
CPC ................ B60H 1/3227; B60H 1/3229; F25B 2400/0403
See application file for complete search history.

(56) References Cited

U.S. PATENT DOCUMENTS 6,516,623 B1 2/2003 Collier
6,883,601 B2 * 4/2005 Ullrich .................. F28F 9/0246
165/177
(Continued)

FOREIGN PATENT DOCUMENTS

CN 1625492 A 6/2005
CN 103660850 A 3/2014
(Continued)

OTHER PUBLICATIONS

International Preliminary Report on Patentability issued on Feb. 13, 2024, in corresponding International Application No. PCT/EP2022/071980, 16 pages.
(Continued)

*Primary Examiner* — Christopher R Zerphey
(74) *Attorney, Agent, or Firm* — Maier & Maier, PLLC

(57) ABSTRACT

A module assembly for a refrigerant circuit of a motor vehicle. The module assembly includes an inner heat exchanger and a heat exchanger through which a coolant can flow. The inner heat exchanger is designed to transfer heat from a high-pressure side of the inner heat exchanger to a
(Continued)

low-pressure side of the inner heat exchanger. The heat is introducible into a refrigerant compressible by the compressor by operating a compressor of the refrigerant circuit. The heat exchanger is subjected to refrigerant that can be supplied to the heat exchanger from the high-pressure side of the inner heat exchanger and can be expanded by an expansion device of the module assembly. The module assembly is formed separately from an evaporator of the refrigerant circuit and/or separately from a condenser of the refrigerant circuit. and includes a support device separate from the heat exchanger, on which the heat exchanger is held.

21 Claims, 11 Drawing Sheets

(52) U.S. Cl.
CPC ......... *B60H 1/32281* (2019.05); *B60H 1/323* (2013.01); *F25B 40/00* (2013.01); *B60H 2001/3291* (2013.01); *F25B 2400/04* (2013.01); *F25B 2400/0403* (2013.01); *F25B 2400/054* (2013.01)

(56) References Cited

U.S. PATENT DOCUMENTS

| | | | | |
|---|---|---|---|---|
| 7,350,368 | B2 * | 4/2008 | Heberle | B60H 1/322 |
| | | | | 62/507 |
| 9,517,680 | B2 * | 12/2016 | Suzuki | B60H 1/00064 |
| 9,908,383 | B2 * | 3/2018 | Heyl | B60H 1/00899 |
| 9,927,153 | B2 * | 3/2018 | Matsumoto | F25B 5/04 |
| 11,192,425 | B2 * | 12/2021 | Oh | B60H 1/00007 |
| 11,440,376 | B2 * | 9/2022 | Calderone | B60K 7/0007 |
| 11,453,267 | B2 * | 9/2022 | Koberstein | B60H 1/00907 |
| 11,958,337 | B2 * | 4/2024 | Ishizeki | F25B 41/20 |
| 11,993,134 | B2 * | 5/2024 | Oh | B60H 1/3229 |
| 2023/0311612 | A1 * | 10/2023 | Denoual | B60H 1/00807 |
| | | | | 165/167 |

FOREIGN PATENT DOCUMENTS

| | | | |
|---|---|---|---|
| DE | 102011110963 | A1 | 6/2012 |
| DE | 102013113229 | A1 | 6/2015 |
| DE | 102018129988 | A1 | 1/2020 |
| EP | 2174810 | B1 | 4/2010 |
| EP | 2350542 | B1 | 8/2017 |
| JP | 2004189069 | A | 7/2004 |
| WO | 02053399 | A1 | 7/2002 |

OTHER PUBLICATIONS

International Search Report and Written Opinion issued Nov. 29, 2022, in corresponding International Application No. PCT/EP2022/071980, 11 pages.

German Examination Report, issued Mar. 4, 2022, in corresponding German Priority Application No. 10 2021 121 252.9, 6 pages.

Office Action issued on Mar. 16, 2026, in corresponding Chinese Application No. 202280046902.1, 17 pages.

* cited by examiner

MODULAR ASSEMBLY FOR A REFRIGERANT CIRCUIT OF A MOTOR VEHICLE, AND REFRIGERANT CIRCUIT

FIELD

The invention relates to a module assembly for a refrigerant circuit of a motor vehicle. The module assembly comprises an inner heat exchanger, which is designed to transfer heat, which is introducible into a refrigerant compressible by means of the compressor by operating a compressor of the refrigerant circuit, from a high-pressure side of the inner heat exchanger to a low-pressure side of the inner heat exchanger. In addition, the module assembly comprises a heat exchanger through which a coolant can flow, which can be subjected to refrigerant that can be supplied to the heat exchanger from the high-pressure side of the inner heat exchanger and can be expanded by means of an expansion device of the module assembly. Furthermore, the invention relates to a refrigerant circuit having such a module assembly.

BACKGROUND

EP 2 174 810 B1 describes a system for cooling or heating an interior of a vehicle. The system comprises a refrigerant circuit having a compressor, a condenser, an evaporator, and an expansion means. The evaporator and the condenser are combined/integrated in this case to form a single, common unit, wherein the common unit is designed as a plate heat exchanger. Furthermore, an inner heat exchanger is integrated into the common unit. The evaporator is designed as a water-cooled evaporator. The evaporator is part of a heat exchanger, which is subjected to cooling water by means of a pump.

Furthermore, EP 2 350 542 B1 describes a condenser for an air conditioning circuit, wherein the condenser is combined with a collecting container and an inner heat exchanger to form a removable component group.

The disadvantage of such combinations of the inner heat exchanger with other components of a refrigerant circuit is the fact that such embodiments result in little flexibility with regard to installing the inner heat exchanger in differently designed refrigerant circuits.

SUMMARY

The object of the present invention is to create a module assembly of the type mentioned at the outset, which enables improved integration into the refrigerant circuit, and to specify a refrigerant circuit having such a module assembly.

The module assembly according to the invention for a refrigerant circuit of a motor vehicle comprises an inner heat exchanger. The inner heat exchanger is designed to transfer heat from a high-pressure side of the inner heat exchanger to a low-pressure side of the inner heat exchanger. The heat is introducible into a refrigerant compressible by means of the compressor by operating a compressor of the refrigerant circuit. The module assembly comprises a heat exchanger through which a coolant can flow. The heat exchanger can be subjected to refrigerant that can be supplied to the heat exchanger from the high-pressure side of the inner heat exchanger, and the refrigerant that can be supplied to the heat exchanger can be expanded by means of an expansion device of the module assembly. The module assembly is designed separately in this case from an evaporator of the refrigerant circuit and/or separately from a condenser of the refrigerant circuit and comprises a support device that is separate from the heat exchanger. The heat exchanger is held on the support device. Consequently, a module part carrier is advantageously provided by the module assembly comprising the inner heat exchanger. Accordingly, improved integration of the module assembly into the refrigerant circuit is possible.

The module assembly comprising the inner heat exchanger can be used very well as a parts connector or parts carrier for other components of the refrigerant circuit. Advantageously, the module assembly provides a block or module block having short tolerance chains. Accordingly, no tolerance compensation is required between the components or parts of the module assembly. This is particularly advantageous with regard to simple integration of the module assembly into the refrigerant circuit.

The module assembly comprising the inner heat exchanger can be used particularly easily as a central element of the refrigerant circuit, which is designed for the direct connection of other components of the refrigerant circuit. Nevertheless, the module assembly is very flexible with regard to integration into the refrigerant circuit, since the evaporator of the refrigerant circuit and/or the condenser of the refrigerant circuit are designed separately from the module assembly and can therefore be coupled to the module assembly, for example via lines. Integrating the module assembly into differently designed or differently complex refrigerant circuits is thus possible particularly flexibly and easily. This is particularly true if both the evaporator of the refrigerant circuit and the condenser of the refrigerant circuit are designed separately from the module assembly.

Advantageously, the support device, which is separate from the heat exchanger through which the coolant can flow and is therefore designed as an independent component of the module assembly, also ensures that the heat exchanger of the module assembly through which the coolant can flow is secured in its position and is therefore is arranged in an easily reproducible manner with regard to its positioning in the refrigerant circuit.

The heat exchanger through which the coolant can flow and which therefore has connections for the coolant on the one hand and connections for the refrigerant on the other hand is also referred to as a chiller. Accordingly, the heat exchanger through which the coolant can flow is also distinguished in terms of its name from the evaporator of the refrigerant circuit, which is usually provided for cooling an air flow flowing over or through the evaporator. The coolant can be cooled particularly strongly by means of the chiller. This is because the refrigerant supplied to the chiller can be expanded during operation of the chiller by means of the expansion device, in particular designed as an expansion valve, which is associated with the module assembly.

Such a chiller can in particular be provided in order to cool an electrical energy storage device of the motor vehicle which has the refrigerant circuit by means of the coolant. The energy storage device preferably provides electrical energy for an electric drive device of the motor vehicle. The provision of the chiller is particularly advantageous in this context because the cooling requirements of such an electrical energy storage device can be covered very well and very quickly by means of the heat exchanger through which the coolant can flow.

In particular, at least the chiller and the support device are provided as independent components, which can be handled separately from other components of the module assembly during the course of manufacturing or assembling the module assembly and are preferably designed as separately manufactured, independent components.

The heat exchanger or chiller through which the coolant can flow can be held directly on the support device, in particular supported directly by the support device, in that the heat exchanger is in direct contact with the support device. However, it can also be provided that the heat exchanger is arranged at least in some areas on another component of the module assembly, which in turn is in direct contact with the support device. The heat exchanger or chiller is also held on the support device in this case, wherein indirect holding of the chiller on the support device is implemented here. In both cases, however, the module assembly forms a module block, which advantageously enables further components of the refrigerant circuit to be directly connected.

The support device can be formed at least in some areas by the inner heat exchanger. This ensures that the module assembly is very compact.

The heat exchanger can be connected here in a materially bonded manner to the inner heat exchanger which is used as the support device or forms at least part of the support device. This ensures that the chiller is secured to the inner heat exchanger in a very resilient manner. Alternatively, the heat exchanger through which the coolant can flow can be coupled in a non-destructively detachable manner to the inner heat exchanger which is used as the support device or forms at least part of the support device. The chiller can then be easily removed, which is advantageous for repairs and/or maintenance.

Additionally or alternatively, it can be provided that the support device is designed as a component of the module assembly that is separate from the inner heat exchanger or comprises such a component, wherein the inner heat exchanger is held on this component. This makes it particularly easy to design the support device for the respective given load, which arises from the fact that the component holds or supports at least the inner heat exchanger and, preferably additionally, the heat exchanger or chiller through which the coolant can flow. The provision of the component separate from the inner heat exchanger as the support device, which is in particular plate-shaped or designed in the manner of a plate, gives the module assembly a particularly high level of robustness.

Furthermore, such a preferably plate-shaped component enables further components of the refrigerant circuit to be integrated into the module assembly in a very simple manner.

In addition, the chiller, the inner heat exchanger, and the support device are then provided as independent components, which can be handled separately from other components of the module assembly in the course of the production or assembly of the module assembly. This means that these components or parts can be designed particularly well for their intended function.

If the support device is designed as a component of the module assembly that is separate from the inner heat exchanger, the inner heat exchanger held, for example supported, by means of this component and/or the heat exchanger or chiller held, for example supported, at least in some areas by means of this component can be connected to the component in a materially bonded manner. In particular, the inner heat exchanger and/or the heat exchanger or chiller through which the coolant can flow can be soldered to the component, which is designed, for example, as a common plate. This ensures that these components of the module assembly are fixed in position particularly well.

Alternatively, the heat exchanger and/or the inner heat exchanger can be coupled in a removable manner to the component designed, for example, as a common plate. This makes it possible to easily replace these components of the module assembly.

If the support device is designed as the component of the module assembly that is separate from the inner heat exchanger, it can be provided that the inner heat exchanger is held directly on this component, wherein the heat exchanger through which the coolant can flow is arranged at least in some areas on the inner heat exchanger. Then the heat exchanger or chiller is also indirectly held on the support device.

Furthermore, it can be provided that the heat exchanger or chiller through which the coolant can flow is held directly on the component of the module assembly that provides the support device and is separate from the inner heat exchanger. In this case, the inner heat exchanger can be arranged at least in some areas on the heat exchanger or chiller through which the coolant can flow. Then the chiller is held directly and the inner heat exchanger indirectly on the component used as the support device.

Both variants enable compact integration of the inner heat exchanger and the heat exchanger or chiller into the module assembly.

Preferably, the component that is separate from the inner heat exchanger is designed in the manner of a plate, which in an installed position of the module assembly has an upper side and a lower side facing away from the upper side. Such a plate-shaped component offers the possibility of arranging and holding further components of the module assembly in a particularly simple manner.

The inner heat exchanger is preferably arranged on the lower side of the component. This makes it possible to use the upper side of the plate-shaped component for other purposes. This can also be advantageous in terms of accessibility to connections of the inner heat exchanger.

Furthermore, it has proven to be advantageous if the heat exchanger or chiller is arranged on a lower side of the inner heat exchanger. This means that the heat transfer or chiller can also be accommodated very compactly in the module assembly. This is also advantageous in terms of good accessibility to connections of the chiller. In this variant, the support device on which the chiller is held is formed by the inner heat exchanger and the plate-shaped component, on the lower side of which the inner heat exchanger is arranged.

Depending on the installation situation, it can furthermore be advantageous to arrange the inner heat exchanger and/or the chiller on the upper side of the plate-shaped component.

Preferably, at least one further component of the module assembly is arranged on the upper side of the component that is separate from the inner heat exchanger. This means that both sides of the component, which is designed in the manner of a plate or plate-shaped, are used to accommodate respective components of the module assembly. This is advantageous in terms of providing a particularly compact module assembly containing a variety of functionalities. Furthermore, the different components of the module assembly are easily accessible.

Preferably, the module assembly comprises at least one collecting device, which is designed to store refrigerant. In this way, even further functional integration into the module assembly is achieved. In addition, in this embodiment, the collecting device, which can be designed as a high-pressure-side collector or as a low-pressure-side accumulator, is fixed precisely and reproducibly with regard to its positioning relative to the other components of the module assembly.

Preferably, the collecting device is held on the support device and/or supported by means of the support device. This ensures that the collecting device is held particularly securely.

The module assembly preferably comprises at least one check valve, by means of which a backflow of refrigerant into the evaporator and/or the condenser is preventable in a suction mode of the refrigerant circuit designed to extract refrigerant from the evaporator and/or from the condenser. This is based on the knowledge that the integration of the at least one check valve into the module assembly is also advantageous with regard to short tolerance chains. This is because the at least one check valve can be connected directly to the heat exchanger or chiller and/or directly to the inner heat exchanger, without needing to provide lines leading to the at least one check valve for this purpose. This is advantageous with regard to the compactness of the module assembly and with regard to the integration of the functionality of the at least one check valve into the module assembly.

The at least one check valve is particularly helpful when inactive components of the refrigerant circuit, i.e., through which refrigerant does not flow, such as the condenser and/or the evaporator, are to be freed from refrigerant in the suction mode of the refrigerant circuit or refrigerant is to be extracted from the evaporator and/or from the condenser. This is advantageous for undisturbed operation of the refrigerant circuit.

Additionally or alternatively, the module assembly can comprise a check valve, by means of which an outflow of the refrigerant from the high-pressure side of the inner heat exchanger to the condenser is preventable in a heating mode of the refrigerant circuit. Such a check valve can also be advantageously integrated into the module assembly, so that expanded functionality of the module assembly is provided.

Preferably, the module assembly comprises at least one expansion valve, by means of which a pressure of the refrigerant, which can be supplied to the condenser in the heating mode, is reducible in a heating mode of the refrigerant circuit. Such an expansion valve can in particular be provided in order to carry out pressure control of at least one branch of the refrigerant circuit. If the expansion valve is integrated into the module assembly, this is advantageous in terms of very extensive functional integration and compact and space-saving accommodation of the expansion valve in the refrigerant circuit.

Preferably, the at least one expansion valve is designed to expand the refrigerant to such an extent that the condenser is usable as an evaporator. By means of the condenser used as an evaporator during operation of the refrigerant circuit, heat is extractable from an ambient air flow that can be supplied to the condenser. Accordingly, the ambient air flow flowing over the typically air-cooled condenser can be used as a heat source, wherein the refrigerant circuit is operated as a heat pump. This means that the at least one expansion valve is usable in a particularly diverse manner.

Additionally or alternatively, the module assembly can comprise a shut-off valve, wherein in a heating mode of the refrigerant circuit, the condenser can be subjected to refrigerant by closing the shut-off valve, and wherein in the heating mode the high pressure side of the inner heat exchanger can be subjected to refrigerant while bypassing the condenser by opening the shut-off valve. By means of such a shut-off valve, the refrigerant flow can be controlled very easily in the heating mode of the refrigerant circuit. In particular, advantageous operating states are settable by the shut-off valve in the heating mode of the refrigerant circuit.

If the shut-off valve is integrated into the module assembly, this is particularly advantageous with regard to a compact accommodation of the shut-off valve accompanied by a short tolerance chain.

Preferably, the module assembly comprises a distribution device, by means of which, during operation of the refrigerant circuit, refrigerant compressed by the compressor can be supplied starting from the distribution device either first to the condenser or first to a heating device of the refrigerant circuit. By means of such a distribution device, the compressor can be used in a simple and inexpensive manner alternately for a cooling mode of the refrigerant circuit and for a heating mode of the refrigerant circuit. If the distribution device is integrated into the module assembly, this is particularly advantageous with regard to a high level of functional integration achievable by the module assembly. In addition, a compact accommodation of the distribution device in the refrigerant circuit is achieved.

The module assembly can comprise at least one bypass line, via which refrigerant can be fed to the heat exchanger through which the coolant can flow, while bypassing the high-pressure side of the inner heat exchanger. Such an integration of the chiller into the module assembly is advantageous, for example, if, during operation of the refrigerant circuit, only a partial flow of the compressed refrigerant is to be supplied to the evaporator after flowing through the high-pressure side of the inner heat exchanger, while a further partial flow of the compressed refrigerant is to be expanded directly by means of the expansion device of the module assembly and then introduced into the chiller.

This means that the partial flow of the compressed refrigerant supplied to the evaporator is undercooled to a greater extent on the high-pressure side of the inner heat exchanger than would be the case if both partial flows flowed through the high-pressure side of the inner heat exchanger. Such a particularly strong undercooling of the partial flow of the compressed refrigerant supplied to the evaporator can be particularly advantageous in order to suppress the occurrence of noises, which can be associated with less undercooled refrigerant flowing through the evaporator or flowing into the evaporator.

The occurrence of the noise, which is avoidable due to the use of the bypass line, can be due in particular to the fact that gas bubbles are still contained in the refrigerant that is not completely liquefied by means of the condenser. Such noises are particularly audible to passengers of the motor vehicle equipped with the refrigerant circuit and are therefore disadvantageous. Therefore, the provision of the at least one bypass line can be advantageous, particularly with regard to increasing comfort for occupants of the motor vehicle.

Additionally or alternatively, the module assembly can comprise at least one bypass line, via which refrigerant can be supplied to the compressor of the refrigerant circuit, bypassing the low-pressure side of the inner heat exchanger. When using this bypass line, the refrigerant coming from the heat exchanger or chiller is heated to a lesser extent than would be the case if the refrigerant were to flow through the low-pressure side of the inner heat exchanger.

This in turn has the result that the compressed refrigerant leaving the compressor is less hot than would be the case if it had previously flowed through the low-pressure side of the inner heat exchanger. In this way, overheating of the refrigerant can be prevented. This is particularly advantageous in view of the fact that decomposition or similar changes of the oil contained in the refrigerant can be avoided. Accordingly, the quality of the refrigerant, which usually contains at least minor admixtures of oil, can be maintained permanently.

Whether the at least one bypass line is used can be determined during operation of the refrigerant circuit, in particular depending on the operating conditions of the refrigerant circuit and/or ambient conditions.

The module assembly can furthermore comprise both the bypass line for bypassing the high-pressure side of the inner heat exchanger and the bypass line for bypassing the low-pressure side of the inner heat exchanger. Then all the advantages described with regard to the respective bypass line can be implemented. The at least one bypass line can also be integrated very easily into the module assembly, since in any case the inner heat exchanger and the heat exchanger or chiller are arranged in a compact design and therefore very close to one another in the module assembly.

The module assembly can comprise at least one further heat exchanger through which a coolant can flow and which can be subjected to the refrigerant compressed by the compressor during operation of the refrigerant circuit. Such a heat exchanger can be referred to as an indirect condenser to distinguish it from the condenser of the refrigerant circuit, which is usually cooled by means of air or by means of an ambient air flow. This further heat exchanger or indirect condenser is preferably integrated into a coolant circuit, which in particular has a further, air-cooled heat exchanger.

By means of the further heat transfer through which the coolant can flow, particularly strong and efficient cooling of the refrigerant compressed by the compressor can be achieved. This is advantageous in terms of high performance of the refrigerant circuit having the module assembly. In addition, the additional heat exchanger through which the coolant can flow and which is integrated into the coolant circuit can be integrated into the module assembly much more easily than the usually air-cooled condenser of the refrigerant circuit. This is also advantageous in terms of a simple connection of the additional heat exchanger to the module assembly.

The at least one further heat exchanger through which the coolant can flow can be arranged in the refrigerant circuit in addition to the air-cooled condenser. It is possible here to arrange the at least one further heat exchanger upstream of the air-cooled condenser and/or downstream of the air-cooled condenser, viewed in the flow direction of the refrigerant. By providing at least one further heat exchanger through which the coolant can flow in addition to the air-cooled condenser, a performance increase is achievable with regard to the cooling of the refrigerant compressed by the compressor.

Furthermore, it can be provided that the at least one further heat exchanger through which the coolant can flow is provided instead of the air-cooled condenser. This is also advantageous in terms of high performance when cooling the refrigerant compressed by means of the compressor.

Additionally or alternatively, it can be provided that a heating device of the refrigerant circuit is provided by the at least one further heat exchanger through which the coolant can flow. The coolant heated by means of the additional heat exchanger can be advantageously used for heating purposes, for example to heat an electrical energy storage device of the motor vehicle having the refrigerant circuit.

Additionally or alternatively, the heat emitted to the coolant in the further heat exchanger can be used to heat air which is introduced into a passenger compartment of the motor vehicle. This is also advantageous in terms of efficient use of the heat contained in the compressed refrigerant.

The inner heat exchanger may include a first tube which is arranged within a second tube. One of the two tubes belongs to the high-pressure side and the other of the two tubes belongs to the low-pressure side of the inner heat exchanger here. Such a design of the inner heat exchanger is particularly advantageous when the refrigerant circuit is used in a motor vehicle which has an internal combustion engine as the drive device. Particularly in such a motor vehicle, there is sufficient installation space for such a design of the inner heat exchanger, which is designed in the manner of a coaxial tube.

The condenser of the refrigerant circuit can namely be arranged in a front end of the motor vehicle. With such an arrangement of the condenser, a comparatively large amount of installation space is advantageously available between an air conditioning unit of the refrigerant circuit arranged in the area of a passenger compartment of the motor vehicle and the condenser arranged in the front end of the motor vehicle. This installation space can therefore be easily used to accommodate the inner heat exchanger comprising the two tubes.

With such a design of the inner heat exchanger comprising the two tubes, it is particularly advantageous that this design is accompanied by a low pressure loss when delivering the refrigerant by means of the compressor of the refrigerant circuit. In particular, in this embodiment, a pressure loss on the suction side is comparatively unproblematic or small with regard to the delivery of the refrigerant by means of the compressor. The low pressure losses advantageously result in a small influence on the performance of the entire system or the refrigerant circuit. Nevertheless, a good transfer of heat from the high-pressure side of the inner heat exchanger to the low-pressure side of the inner heat exchanger can be achieved.

Additionally or alternatively, the inner heat exchanger can be designed as a plate heat exchanger. In such a plate heat exchanger there is a comparatively low ratio of the length of the inner heat exchanger to its width and/or the length to its height. Therefore, the inner heat exchanger designed as a plate heat exchanger is particularly advantageously integratable into a refrigerant circuit which is arranged or is used in an electrically driven motor vehicle.

This is based on the knowledge that a refrigerant circuit for a motor vehicle designed as an electric vehicle or hybrid vehicle is usually comparatively compact and also highly branched. In particular for such a refrigerant circuit, the provision of the module assembly, which is also compact and offers options for combination with other components of the refrigerant circuit, is particularly advantageous.

In addition, the design of the inner heat exchanger as a plate heat exchanger advantageously allows a space-saving arrangement and connection of further components in the refrigerant circuit. In addition, a particularly large amount of heat can be transferred from the high-pressure side to the low-pressure side of the plate heat exchanger via the module assembly comprising the plate heat exchanger. Such a high degree of exchange is advantageous in terms of the efficiency gain that is achievable by providing the inner heat exchanger.

Nevertheless, the plate heat exchanger is designed in such a way that the pressure losses associated with the refrigerant flowing through the inner heat exchanger are acceptable. This also applies to the pressure loss on the suction side, i.e., related to the suction side of the compressor. Therefore, even the inner heat exchanger designed as a plate heat exchanger has a comparatively small influence on the performance of the entire system or the entire refrigerant circuit.

In a particularly simple embodiment, the inner heat exchanger can comprise two respective plates having flow profiles or flow channels, which can in particular be designed as extruded profiles. The two plates form the high-pressure side and the low-pressure side of the plate heat exchanger. The plates are separated from one another by a separating plate in order to separate the material flows in the form of the refrigerant flowing through the high-pressure side and the refrigerant flowing through the low-pressure side from one another.

Furthermore, it can be provided that the plate heat exchanger providing the inner heat exchanger has a plurality of high-pressure-side plates and a plurality of low-pressure-side plates. In this way, a particularly good and extensive transfer of heat from the high-pressure side to the low-pressure side can be achieved. In this embodiment as well, the plates have respective flow profiles or flow channels.

The plate heat exchanger can be designed as a counter-current heat exchanger, as a cocurrent heat exchanger, or as a crosscurrent heat exchanger. Particularly with regard to the accessibility to inlets or outlets on the high-pressure side and the low-pressure side of the inner heat exchanger, designing the plate heat exchanger as a countercurrent heat exchanger or as a cocurrent heat exchanger has proven to be advantageous. Furthermore, a design as a countercurrent heat exchanger or as a cocurrent heat exchanger is advantageous with regard to the exchange performance or the transfer of heat. The latter is particularly true if the plate heat exchanger is designed as a countercurrent heat exchanger.

The refrigerant circuit according to the invention for a motor vehicle has a module assembly according to the invention. This achieves a very extensive functional integration of components of the refrigerant circuit into the module assembly.

Preferably, the module assembly is coupled via respective lines to an evaporator of the refrigerant circuit and to a condenser of the refrigerant circuit. Depending on the design of the lines, this makes it particularly easy to integrate the module assembly into the refrigerant circuit.

The advantages and preferred embodiments described for the module assembly according to the invention also apply to the refrigerant circuit according to the invention and vice versa.

The invention therefore also includes refinements of the refrigerant circuit according to the invention, which have features that have already been described in the context of the refinements of the module assembly according to the invention. For this reason, the corresponding refinements of the refrigerant circuit according to the invention are not described once again here.

A motor vehicle according to the invention, which has a refrigerant circuit according to the invention, is preferably designed as an automobile, in particular as a passenger car or truck, or as a passenger bus.

In particular, the motor vehicle can have an electrical energy storage device designed to supply an electric drive device of the motor vehicle, wherein the electrical energy storage device can be cooled by means of the coolant that can be supplied to the heat exchanger or chiller.

The invention also comprises the combinations of the features of the described embodiments. The invention therefore also comprises implementations that each have a combination of the features of several of the described embodiments, provided that the embodiments have not been described as mutually exclusive.

BRIEF DESCRIPTION OF THE FIGURES

Exemplary embodiments of the invention are described hereinafter. In the figures.

DETAILED DESCRIPTION

Figure 1:
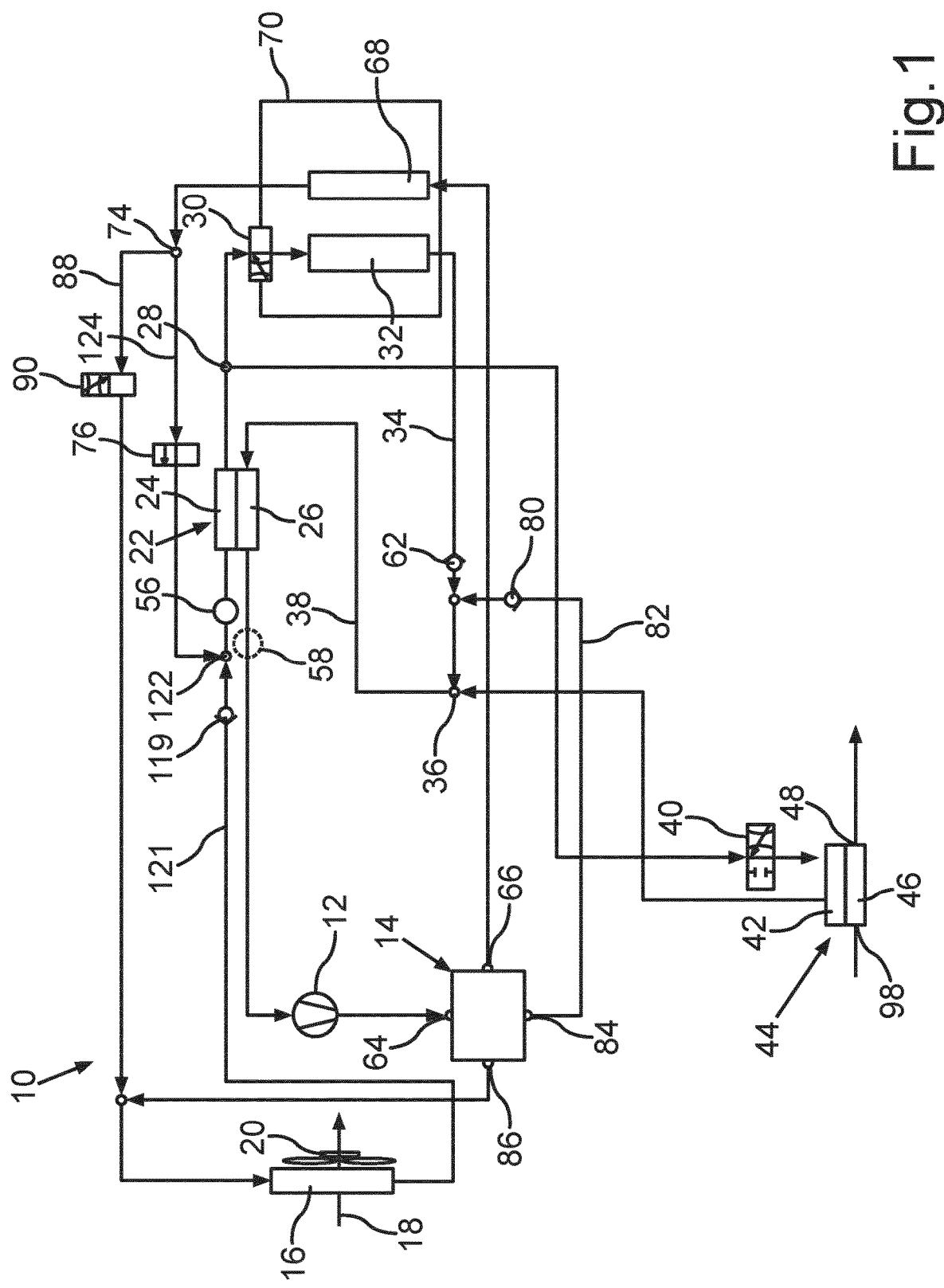
FIG. 1 schematically shows a refrigerant circuit for a motor vehicle, which comprises an inner heat exchanger and a heat exchanger or chiller through which a coolant can flow.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

A refrigerant circuit 10 or refrigerant circuit for a motor vehicle is shown schematically in FIG. 1. The refrigerant circuit 10 comprises a compressor 12 in a manner known per se. In an air conditioning mode or cooling mode of the refrigerant circuit 10, compressed refrigerant is supplied to a condenser 16 or gas cooler by means of the compressor 12. In the embodiment of the refrigerant circuit 10 shown as an example in FIG. 1, the refrigerant circuit 10 has an (optional) distribution device 14, via which the compressed refrigerant can be supplied to the condenser 16. Air flowing through the condenser 16 and causing condensation of the compressed and gaseous refrigerant is illustrated in FIG. 1 by an arrow 18. Furthermore, a fan 20 is shown in FIG. 1, by means of which the air used to cool the refrigerant can flow through the condenser 16.

The high-pressure, but liquefied refrigerant coming from the condenser 16 in the air conditioning mode of the refrigerant circuit 10 is, in particular after flowing through a refrigerant collector 56 (see FIG. 1), supplied to an inner heat exchanger 22 of the refrigerant circuit 10, namely a high-pressure side 24 the inner heat exchanger 22. Furthermore, the inner heat exchanger 22 has a low-pressure side 26 in a manner known per se. Heat contained in the compressed refrigerant is transferred from the high-pressure side 24 to the low-pressure side 26 of the inner heat exchanger 22. This has, among other things, the result that the compressor 12 is supplied with warmer gaseous and low-pressure refrigerant from the low-pressure side 26 of the inner heat exchanger 22 than would be the case without the provision of the inner heat exchanger 22.

Downstream of the high-pressure side 24 of the inner heat exchanger 22, the refrigerant circuit 10 can have a first branch point 28, as shown here by way of example. From the branch point 28, the liquefied refrigerant can be supplied in a manner known per se to a first expansion valve 30, which is connected upstream of an evaporator 32 of the refrigerant circuit 10. In the air conditioning mode of the refrigerant circuit 10, the refrigerant expanded by means of the expansion valve 30 can be supplied to a further or second branch point 36 via a line branch 34 after leaving the evaporator 32. A line 38 can lead from the further branch point 36 to the low-pressure side 26 of the inner heat exchanger 22. In the air conditioning mode, the gaseous refrigerant leaving the low-pressure side 26 of the inner heat exchanger 22 is then supplied back to the compressor 12.

At the first branch point 28 of the refrigerant circuit 10, in the refrigerant circuit 10 shown as an example in FIG. 1, the high-pressure liquefied refrigerant 10 can additionally or alternatively also be supplied to a further expansion device in the form of a second expansion valve 40, shown by way of example in the present case. This second expansion valve 40 is arranged upstream of an evaporator side 42 of a heat exchanger through which a coolant can flow, which is also referred to as a chiller 44. The chiller 44 of the refrigerant circuit 10 has a coolant side 46 through which the coolant flows during operation of the chiller 44. In this case, the coolant emits heat to the refrigerant flowing through the evaporator side 42 and previously expanded by means of the second expansion valve 40. Therefore, highly cooled coolant is available at an outlet 48 of the chiller 44.

If the refrigerant circuit 10 is arranged in a motor vehicle designed as an electric vehicle or as a hybrid vehicle, heat can be dissipated from an electrical energy storage device (not shown) of the motor vehicle by means of the coolant cooled in the chiller 44, for example in order to cool battery cells of the electrical energy storage device.

It can be provided that in the air conditioning mode of the refrigerant circuit 10 only the evaporator 32 is subject to the refrigerant expanded by means of the first expansion valve 30, for example in order to cool a passenger compartment (not shown) of the motor vehicle. Furthermore, it can be provided that the first expansion valve 30 remains closed and the refrigerant is only expanded at the second expansion valve 40, so that only the evaporator side 42 of the chiller 44 is subjected to the expanded refrigerant. In addition, it is possible to apply expanded refrigerant to the evaporator 32 and the chiller 44 at the same time by at least partially opening the first expansion valve 30 and the second expansion valve 40.

In the refrigerant circuit 10 shown in FIG. 1, the expanded refrigerant coming from the evaporator side 42 of the chiller 44 is supplied via the further branch point 36 to the low-pressure side 26 of the inner heat exchanger 22 again. If only cooling of the battery cells of the electrical energy storage device of the motor vehicle is provided, it can be provided that the refrigerant only flows through the second expansion valve 40.

It is also possible to supply the refrigerant flow to both the first expansion valve 30 and the second expansion valve 40 at the first branch point 28, for example if both the passenger compartment of the motor vehicle and the battery cells of the electrical energy storage device are to be cooled.

In the present case, at least the inner heat exchanger 22, the chiller 44, and the second expansion valve 40 are preferably combined to form a module assembly 50. A first variant of the module assembly 50 is shown schematically in FIG. 2, and a second variant of the module assembly 50 is shown schematically in FIG. 3.

Figure 2:
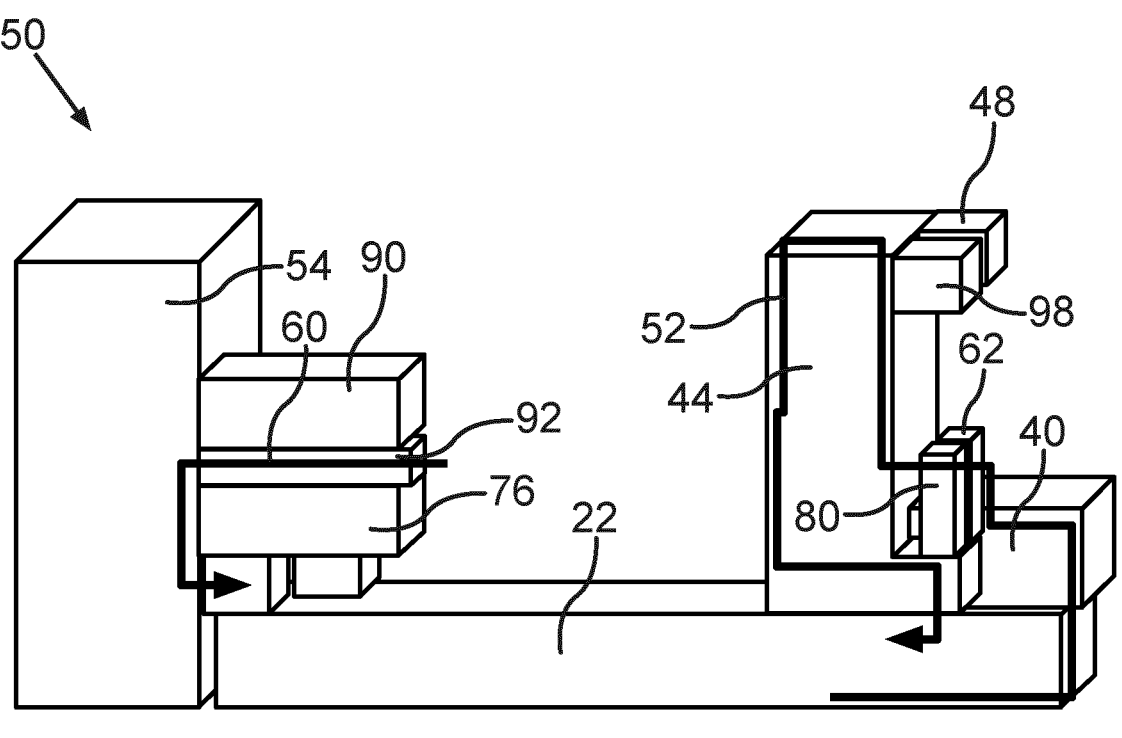
FIG. 2 very schematically shows a first variant of a module assembly of the refrigerant circuit, wherein the inner heat exchanger is designed as a support device for the chiller.

In the variant of the module assembly 50 shown in FIG. 2, the inner heat exchanger 22 provides a support device or a carrier part on which the chiller 44 is arranged. Accordingly, the chiller 44 is supported by the inner heat exchanger 22, which is used as a support device. Furthermore, the second expansion valve 40 is also part of the module assembly 50 shown in FIG. 2. In this case, the inner heat exchanger 22 is moreover used as the carrier or as the support device for the second expansion valve 40, wherein the second expansion valve 40 can be supported or attached, for example, on the inner heat exchanger 22. However, the second expansion valve 40 can also be attached to the chiller 44.

In FIG. 2, a possible flow path 52 of the refrigerant is illustrated by an angled arrow. According to this flow path 52, the refrigerant passes from the high-pressure side 24 of the inner heat exchanger 22 (cf. FIG. 1) via the second expansion valve 40 into the chiller 44 and then from the chiller 44 to the low-pressure side 26 of the inner heat exchanger 22 (cf. FIG. 1).

In the variant of the module assembly 50 shown in FIG. 2, the inner heat exchanger 22 can be designed as a flat plate heat exchanger, in particular as a crosscurrent counterexchanger or as a countercurrent heat exchanger. The inner heat exchanger 22 can comprise a plurality of plates soldered or otherwise connected together.

Additionally or alternatively, the inner heat exchanger 22 used as the support device can be formed by two extruded profiles connected to one another and thus provide the supporting function at least for the chiller 44 and for the second expansion valve 40. Furthermore, it is possible that the inner heat exchanger 22, which is used according to FIG. 2 as the support device, is formed or provided by a single extruded profile, which has flow channels for the high-pressure refrigerant, on the one hand, and has flow channels for the expanded or low-pressure refrigerant, on the other hand. Here, the flow channels on the high-pressure side or associated with the high-pressure side 24 are fluidically separated from the flow channels on the low-pressure side or associated with the low-pressure side 26.

In addition, block connections or line connections, not shown in detail here, can be attached, in particular soldered, to the inner heat exchanger 22, via which lines of the refrigerant circuit 10 (cf. FIG. 1) can be connected to the inner heat exchanger 22.

It is also apparent from FIG. 2 that the module assembly 50 can comprise a collecting device 54. The collecting device 54 can be designed as the refrigerant collector 56, as shown by way of example in FIG. 1, which is arranged upstream of the high-pressure side 24 of the inner heat exchanger 22. Alternatively, the collecting device 54 can be designed as a so-called accumulator 58, which is arranged downstream of the low-pressure side 26 of the inner heat exchanger 22. Independently of whether the collecting device 54 is designed as the high-pressure-side refrigerant collector 56 or as the low-pressure-side accumulator 58, the collecting device 54 is used to store refrigerant and preferably also to dry and filter the refrigerant.

In FIG. 2, a further angled arrow 60 illustrates how the refrigerant can be supplied to the inner heat exchanger 22 after flowing through the collecting device 54 (designed in particular as the refrigerant collector 56 according to FIG. 1).

As indicated in FIG. 2, the collecting device 54 can be attached to the inner heat exchanger 22 which is used as a support device for the chiller 44. However, it is also possible to integrate the collecting device 54 into the module assembly 50 in another way.

In the variant of the module assembly 50 shown in FIG. 2, the module assembly 50 furthermore comprises a first check valve 62, which according to FIG. 1 is arranged in the line branch 34, which leads from the evaporator 32 to the further branch point 36. This first check valve 62 prevents refrigerant from flowing back into the evaporator 32 when refrigerant is extracted from the evaporator 32 in a suction mode of the refrigerant circuit 10. In such a suction mode, the refrigerant circuit 10 can be operated, for example, as a heat pump, for example to heat the passenger compartment of the motor vehicle. In this heat pump mode, at the distribution device 14, the compressed refrigerant introduced into the distribution device 14 by the compressor 12 via an inlet 64 can be supplied to a first outlet 66 of the distribution device 14.

From the first outlet 66 of the distribution device 14, the compressed and therefore warm refrigerant travels via a line to a heating device in the form of a heating register 68, which in the embodiment of the refrigerant circuit 10 shown as an example in FIG. 1 is accommodated, like the evaporator 32, in an air conditioning unit 70 of the motor vehicle. If air passes over the heating register 68, the air heated by means of the heating register 68 can be introduced into the passenger compartment of the motor vehicle.

In the heat pump mode of the refrigerant circuit 10, the refrigerant which leaves the heating register 68 is, in the present case, supplied to a further or third branch point 74. Starting from this third branch point 74, the high-pressure refrigerant can be supplied via a (in this case open) shut-off valve 76 (according to FIG. 1) first to the refrigerant collector 56 and then to the high-pressure side 24 of the inner heat exchanger 22. From there, in the heat pump mode, the refrigerant reaches the chiller 44 via the first branch point 28.

In the heat pump mode, heat is preferably introduced into the refrigerant at the chiller 44 of the refrigerant circuit 10. Accordingly, in particular the waste heat from the battery cells of the electrical energy storage device and/or other electrical and/or electronic components of the motor vehicle can be introduced into the refrigerant flowing through the chiller 44. This and the provision of the inner heat exchanger 22 result in the compressor 12 being supplied with particularly warm refrigerant. After the compression and thus further heating of the refrigerant by means of the compressor 12, a particularly large amount of heat can be emitted to the air to be heated at the heating register 68.

In this heat pump mode, the evaporator 32 is not needed. Therefore, refrigerant is extracted from the evaporator 32 via the line branch 34. In this suction mode of the refrigerant circuit 10, the first check valve 62 prevents refrigerant from flowing back into the evaporator 32.

Additionally or alternatively to the first check valve 62, the module assembly 50 can comprise a second check valve 80, as shown schematically in FIG. 2. This second check valve 80 prevents refrigerant extracted from the condenser 16 from being able to flow back into the condenser 16 during the heat pump mode of the refrigerant circuit 10. The provision of the second check valve 80 is therefore also advantageous, particularly in the suction mode or heat pump mode of the refrigerant circuit 10.

The second check valve 80 is connected to a further or second outlet 84 of the distribution device 14 via a further line branch 82 in the refrigerant circuit 10 shown as an example in FIG. 1 for the purpose of extracting refrigerant from the condenser 16.

A further or third outlet 86 of the distribution device 14 is used in this suction mode of the refrigerant circuit 10 as an inlet for the refrigerant coming from the condenser 16. In the air conditioning mode of the refrigerant circuit 10 described above, in contrast, the refrigerant is supplied from the inlet 64 to the condenser 16 via the third outlet 86. By also integrating the second check valve 80 into the module assembly 50, a particularly extensive integration of functions and components of the refrigerant circuit 10 into the module assembly 50 is achieved.

From FIG. 2 it can also be seen that the shut-off valve 76 can also be integrated into the module assembly 50. For example, the inner heat exchanger 22 can additionally be used as a support device for the shut-off valve 76 (cf. FIG. 1).

The refrigerant circuit 10 shown in FIG. 1 can also be used in a so-called reheat mode (reheating mode). Even in the reheat mode, the refrigerant compressed by means of the compressor 12 is first supplied to the heating register 68 via the inlet 64 of the distribution device 14 and the first outlet 66 of the distribution device 14.

From the heating register 68, the refrigerant can be supplied to a further expansion valve 90 via a further line branch 88 via the further or second branch point 74 with the shut-off valve 76 closed. From this expansion valve 90, the refrigerant can be supplied to the condenser 16 and then introduced into the evaporator 32 via the high-pressure side 24 of the inner heat exchanger 22. Such a reheat mode of the refrigerant circuit 10 is particularly advantageous if further cooling of the refrigerant is to take place at the condenser 16.

Alternatively, a reheat mode of the refrigerant circuit 10 is possible in which the expansion valve 90 remains closed and the shut-off valve 76 is opened. Then the refrigerant is supplied to the evaporator 32 via the high-pressure side 24 of the inner heat exchanger 22 while bypassing the condenser 16.

In such reheat operating modes of the refrigerant circuit 10, the evaporator 32 is used in particular to dehumidify the air to be introduced into the passenger compartment of the motor vehicle, and the heating register 68 is used to heat this air, which has been dehumidified by means of the evaporator 32, before it enters the passenger compartment.

As can be seen from FIG. 2, the further expansion valve 90, by means of which the pressure of the refrigerant which is supplied to the condenser 16 can be reduced in this heating mode of the refrigerant circuit 10, can also be part of the module assembly 50. In particular, the inner heat exchanger 22 can be used as a carrier for the shut-off valve 76. Furthermore, according to FIG. 2, a further carrier part 92 of the module assembly 50 can be arranged on the shut-off valve 76, which is used to attach the further expansion valve 90.

Figure 3:
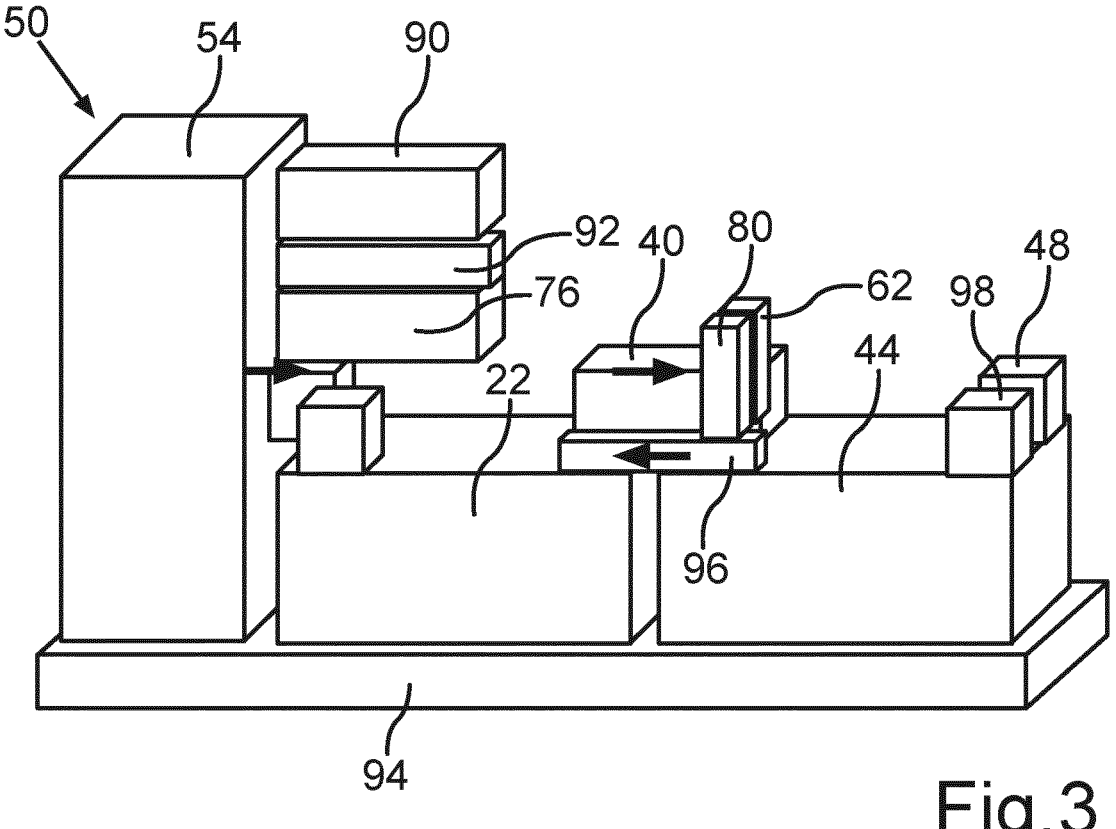
FIG. 3 very schematically shows a further variant of the module assembly, in which a component separate from the inner heat exchanger is provided in the form of a plate as a support device, wherein the inner heat exchanger and the chiller are arranged on the common plate.

In the variant of the module assembly 50 shown in FIG. 3, the inner heat exchanger 22 is not designed as a support device for the chiller 44 and preferably other components of the module assembly 50. Rather, in this variant, the module assembly 50 has a preferably plate-shaped component, separate from the inner heat exchanger 22, for example in the form of a common plate 94. In this variant of the module assembly 50, the inner heat exchanger 22 is supported, in particular directly supported, by means of the plate 94 used as a support device for the module assembly 50 or on the common plate 94.

Furthermore, the chiller 44 is also directly supported by the common plate 94. Accordingly, in the variant of the module assembly 50 shown as an example in FIG. 3, both the inner heat exchanger 22 and the chiller 44 are in direct contact with the plate 94. The inner heat exchanger 22 and/or the chiller 44 can be soldered on the common plate 94 or mounted on the plate 94 in a non-destructively removable manner.

Moreover, it can be seen from FIG. 3 that in addition the collecting device 54, which can be designed as the refrigerant collector 56 or as the battery 58 according to FIG. 1, can be directly supported by means of the plate 94 used as a support device. Accordingly, the collecting device 54 can also be arranged on the plate 94.

In the variant of the module assembly 50 shown in FIG. 3, the module assembly 50 preferably also comprises the first expansion valve 40 and the two check valves 62, 80. However, here the first expansion valve 40, via which the refrigerant coming from the high-pressure side 24 of the inner heat exchanger 22 the evaporator side 42 of the chiller 44 is supplied, is attached with respective partial areas to both the inner heat exchanger 22 and the chiller 44.

In contrast, the check valves 62, 80 can be attached to a carrier part 96 of the module assembly 50, which is connected to both the inner heat exchanger 22 and the chiller 44 according to FIG. 3. Furthermore, it is possible to attach at least one of the check valves 62, 80 to the first expansion valve 40.

In the case of the module assembly 50 shown in FIG. 3, the module assembly 50 preferably also comprises the further expansion valve 90 connected upstream of the condenser 16, the carrier part 92, and the shut-off valve 76 (cf. FIG. 1). The arrangement of these components in the module assembly 50 essentially corresponds in this case to the arrangement on the inner heat exchanger 22 explained with reference to FIG. 2.

In a further variant of the module assembly 50 (not explicitly shown here), the collecting device 54 can be arranged on the plate 94, wherein the inner heat exchanger 22 is also arranged on the plate 94 and is in direct contact with the plate 94. In contrast, the chiller 44 can be arranged on the inner heat exchanger 22.

In a further variant of the module assembly 50 (also not explicitly shown), it is possible for the chiller 44 and the collecting device 54 to be arranged on the plate 94, wherein the inner heat exchanger 22 is not in contact with the plate 94, but is arranged on the chiller 44.

However, mixed forms of the variants of the module assembly 50 explained above or shown as examples in FIG. 2 and FIG. 3 are also possible. Accordingly, only areas of the inner heat exchanger 22 and/or the chiller 44 can be supported directly on the support device and other areas of the inner heat exchanger 22 and/or the chiller 44 can only be indirectly in contact with the support device.

In the further variants shown in FIG. 3 and in the further variants of the module assembly 50 explained above, however, the components of the module assembly 50 are preferably directly joined or connected to one another, in particular soldered together, for example via block connections or line connections and/or the plate 94.

In FIG. 2 and in FIG. 3, both the outlet 48 of the coolant side 46 of the chiller 44 and an inlet 98 of the coolant side 46 of the chiller 44 (cf. FIG. 1) are shown very schematically. As is apparent from both FIG. 2 and FIG. 3 in this regard, these connections for the coolant are advantageously easily accessible in the module assembly 50.

In the variants of the module assembly 50 shown in FIG. 2 and FIG. 3, the inner heat exchanger 22 and/or the chiller 44 can be used as a parts carrier for further components of the refrigerant circuit 10, so that a module block having short tolerance chains is formed.

Figure 4:
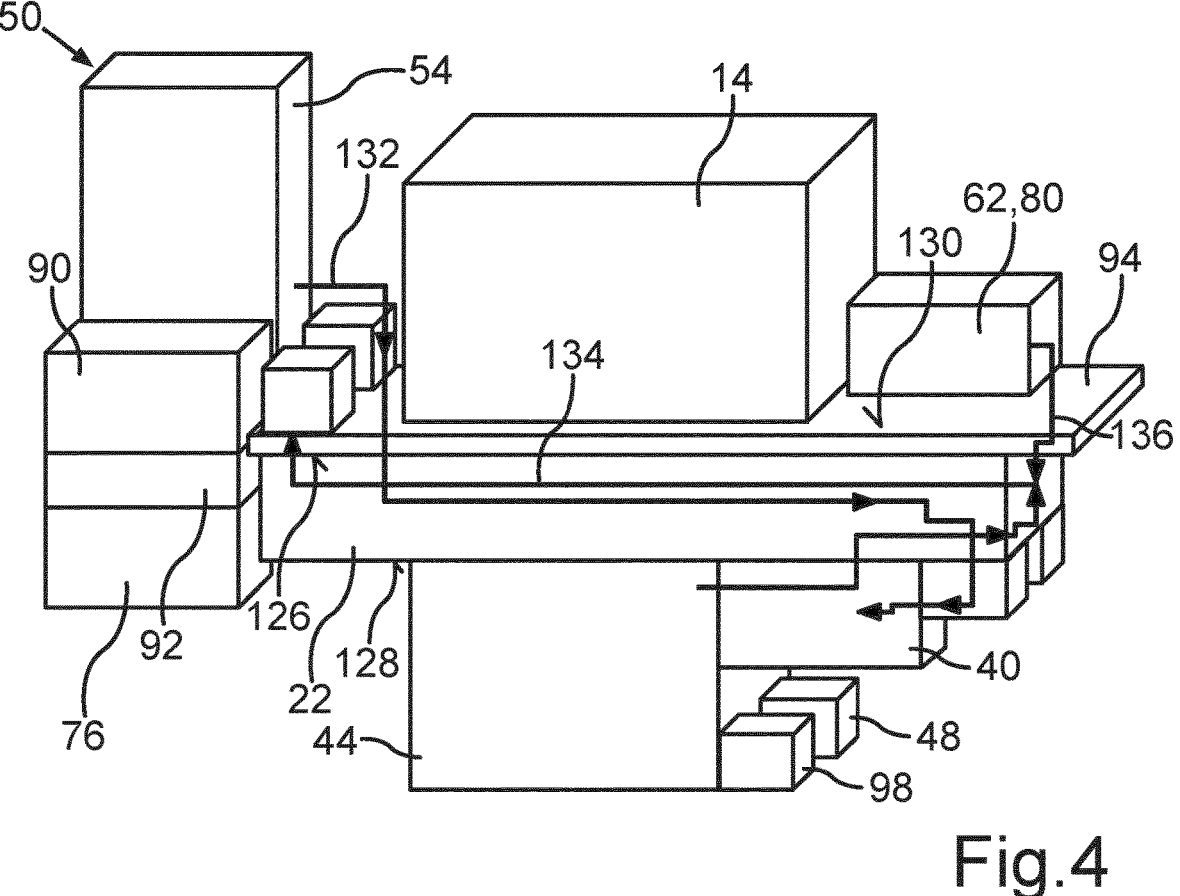
FIG. 4 very schematically shows a further variant of the module assembly, in which the inner heat exchanger is arranged on an lower side of the plate-shaped component, wherein the chiller is arranged on an lower side of the inner heat exchanger, and wherein further components of the module assembly are arranged on an upper side of the plate-shaped component.

In the variant of the module assembly 50 shown in FIG. 4, the common plate 94 is also provided. However, in contrast to the embodiment according to FIG. 3, the inner heat exchanger 22 is arranged here on a lower side 126 of the plate 94. This because the module assembly 50 is shown in FIG. 4 in its installed position, i.e., in the orientation that the module assembly 50 has as a result of being installed in the refrigerant circuit 10 in the motor vehicle.

Furthermore, in this variant of the module assembly 50, the chiller 44 is held or arranged on a lower side 128 of the inner heat exchanger 22. Accordingly, the second expansion valve 40, via which the refrigerant supplied to the chiller 44 is expanded, is also arranged on the lower side 128 of the inner heat exchanger 22. In this embodiment, at least one further component of the module assembly 50, namely the collecting device 54 and/or the carrier part 92 with the further expansion valve 90 and the shut-off valve 76, preferably adjoins a narrow side of the plate 94.

In addition, the plate 94 has an upper side 130, which can advantageously be used to accommodate further components of the module assembly 50. In the variant of the module assembly 50 shown schematically in FIG. 4, the distribution device 14 and the two check valves 62, 80 (cf. FIG. 1) are arranged on the upper side 130 of the plate 94. In this embodiment, both the inner heat exchanger 22 and the chiller 44 are preferably designed as plate heat exchangers. Furthermore, the collecting device 54 can be mounted on the common plate 94, in particular in the form of the high-pressure side refrigerant collector 56 (cf. FIG. 1) and the distribution device 14, which is designed in the present case as a multi-way valve.

Block connections for connecting lines can be soldered directly on the module assembly 50. Such a block connection can be formed in particular between the inner heat exchanger 22 and the distribution device 14 and integrated into the module assembly 50, for example in the area of the check valves 62, 80. Furthermore, the check valves 62, 80 can be integrated into the block connection.

In FIG. 4, a first angled arrow 132 schematically illustrates a flow path of the compressed, hot refrigerant through the high-pressure side 24 of the inner heat exchanger 22 and then via the second expansion valve 40 into the chiller 44. A further angled arrow 134 in FIG. 4 shows the return of the refrigerant from the chiller 44 via the low-pressure side 26 of the inner heat exchanger 22.

In addition, a possible flow path of the refrigerant in the suction mode of the refrigerant circuit 10 is shown in FIG. 4 by a third angled arrow 136. Accordingly, the refrigerant reaches the low-pressure side 26 of the inner heat exchanger 22 via the distribution device 14 and the check valves 62, 80 (cf. FIG. 1). In this case, line lengths of the line 38 shown in FIG. 1 and of the line branch 82 can be kept particularly short or almost eliminated. Because of the compact design of the module assembly 50, the corresponding distances to be covered by the refrigerant in the module assembly 50 are particularly short.

Figure 5:
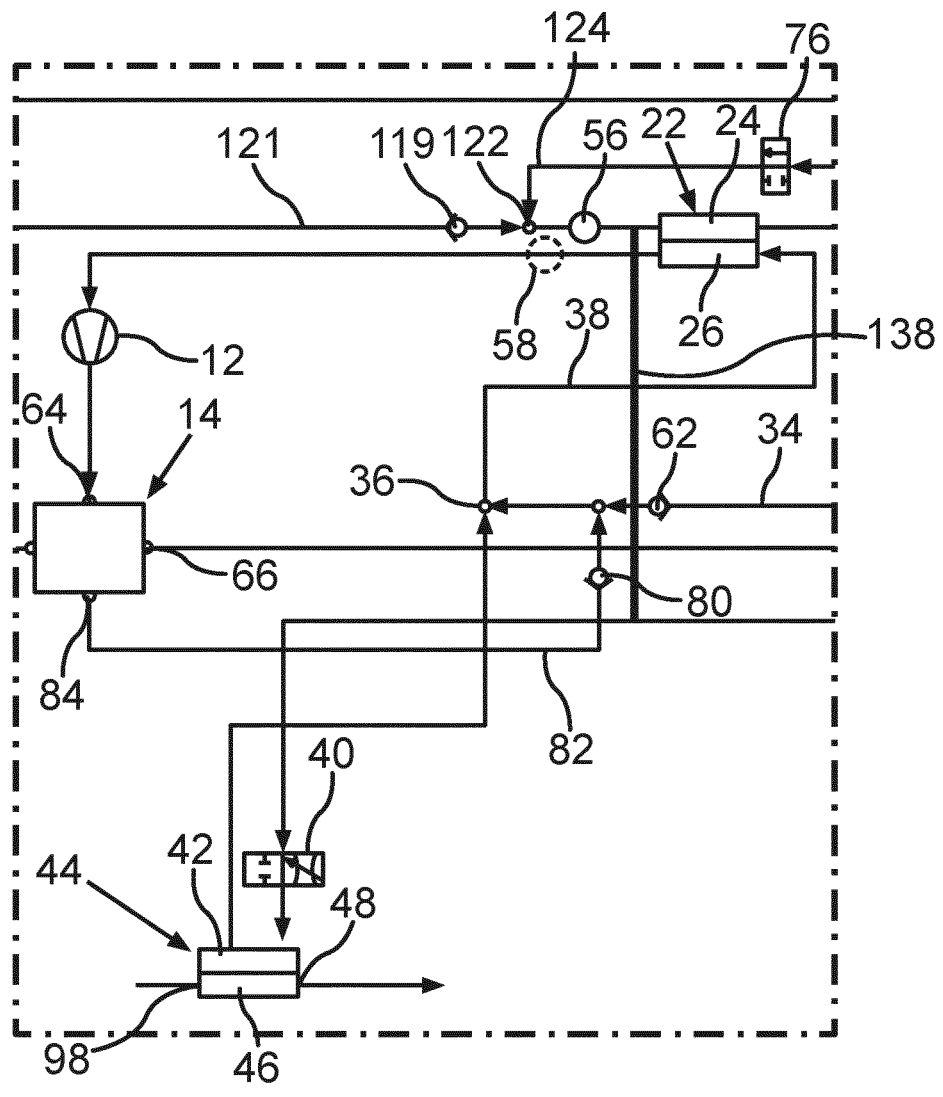
FIG. 5 shows a detail of a variant of the refrigerant circuit according to FIG. 1, in which a bypass line is provided for bypassing the high-pressure side of the inner heat exchanger.

In FIG. 5, the refrigerant circuit 10 is shown schematically and in detail in a variant, in which the module assembly 50 comprises a first bypass line 138. The refrigerant can be supplied to the chiller 44 via this first bypass line 138, while bypassing the high-pressure side 24 of the inner heat exchanger 22.

Such an operating mode is reasonable if the refrigerant flow is allocated to the bypass line 138 on the one hand and to the first expansion valve 30 (see FIG. 1) at a branch point arranged in the present case between the high-pressure side refrigerant collector 56 and the high-pressure side 24. This is because the partial flow of the refrigerant supplied to the evaporator 32 via the first expansion valve 30 is then particularly strongly undercooled by means of the inner heat exchanger 22. This is particularly advantageous in order to suppress the development of noise, which can occur if the refrigerant is less strongly undercooled in the area of the evaporator 32.

Figure 6:
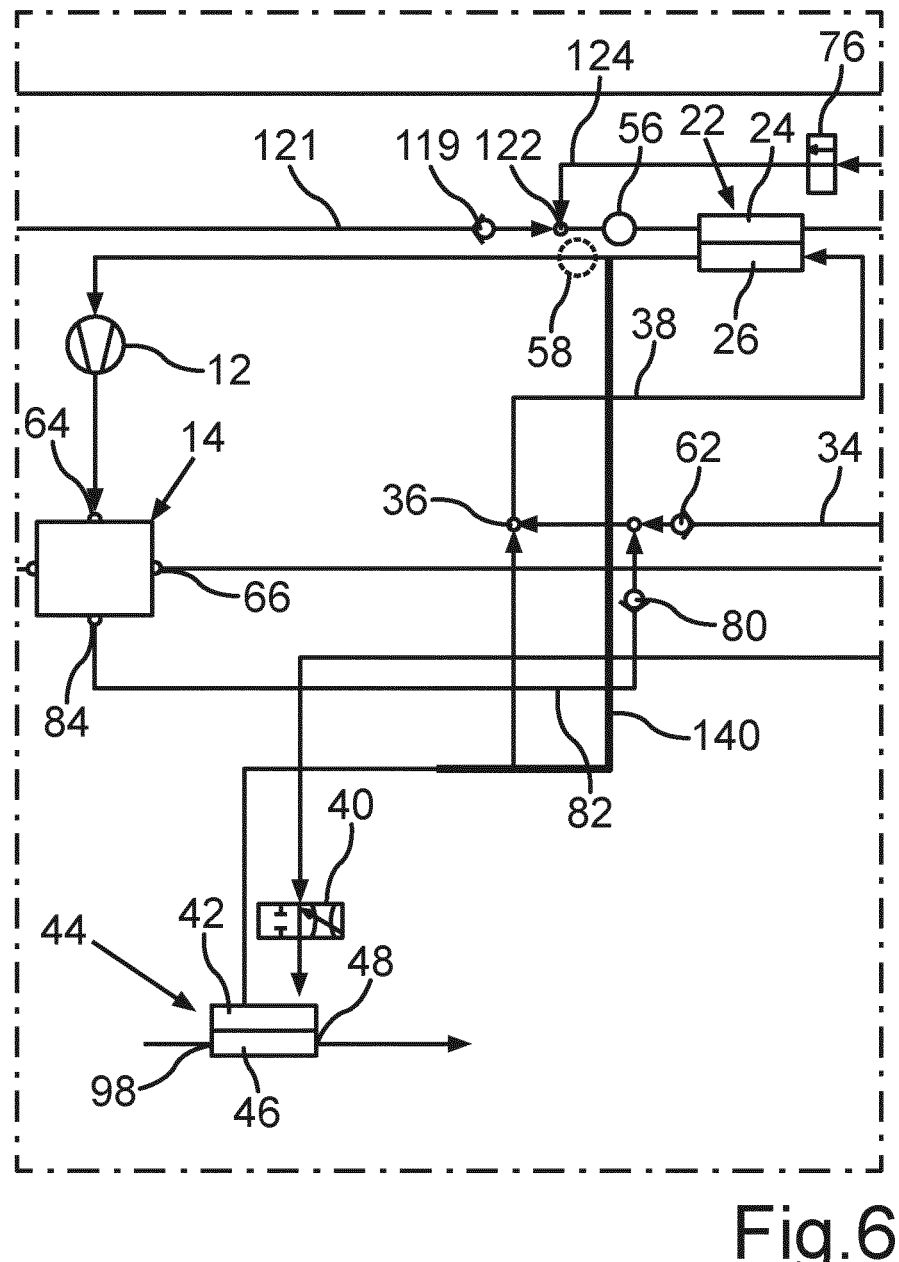
FIG. 6 shows a detail of a further variant of the refrigerant circuit according to FIG. 1, in which a bypass line is provided for bypassing a low-pressure side of the inner heat exchanger.

In the wide variant of the refrigerant circuit 10 shown in detail in FIG. 6, the module assembly 50 can comprise a second bypass line 140, via which refrigerant or a partial flow of the refrigerant can be supplied to the compressor 12 of the refrigerant circuit 10, while bypassing the low-pressure side 26 of the inner heat exchanger. Accordingly, the refrigerant supplied to the compressor 12 is heated to a lesser extent than would be the case if it flowed through the low-pressure side 26 of the inner heat exchanger 22.

This can be advantageous if the refrigerant would otherwise be heated to an undesirable degree by means of the compressor 12. Very strong heating of the refrigerant can in particular result in the oil contained in the refrigerant decomposing and thus losing its previously provided properties. This can be avoided by using the second bypass line 140.

Figure 7:
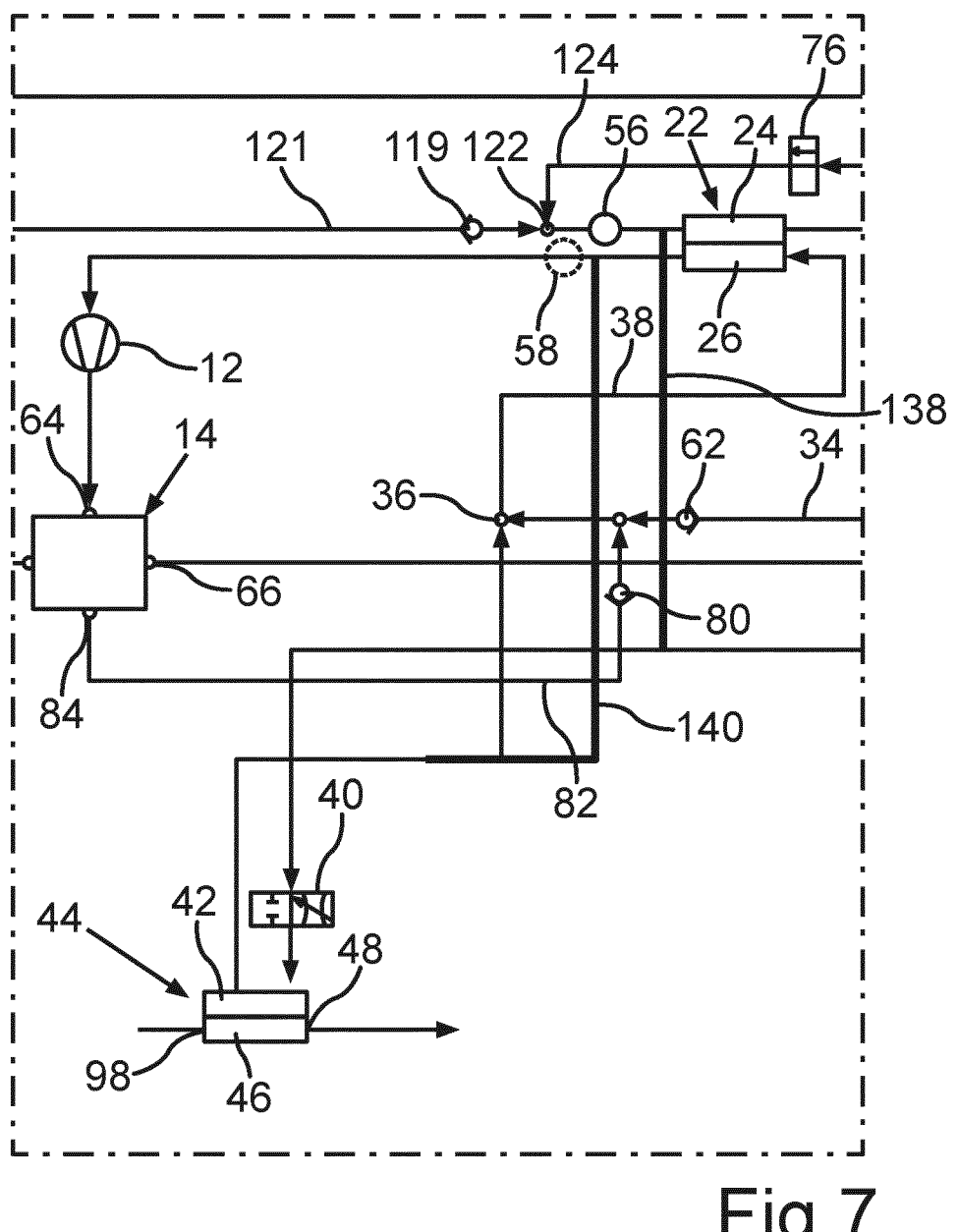
FIG. 7 shows a detail of a further variant of the refrigerant circuit having the two bypass lines according to FIG. 5 and FIG. 6.

In the further variant of the refrigerant circuit 10 shown in detail in FIG. 7, the module assembly 50 has both the first bypass line 138 and the second bypass line 140. Then all of the advantages explained above are achievable in operation of the refrigerant circuit 10.

Further variants of the refrigerant circuit 10 or the module assembly 50 are to be explained with reference to FIG. 8. For example, the refrigerant circuit 10 can have at least one further heat exchanger 142, 144, 146, 148 through which a coolant can flow. Such a heat exchanger 142, 144, 146, 148, which can be cooled by means of the coolant, can also be referred to as a direct condenser. In particular, when the further heat exchanger 142, 44, 146, 148 is designed as a plate heat exchanger, it can be connected particularly well to the module assembly 50 or integrated into the module assembly 50.

Figure 8:
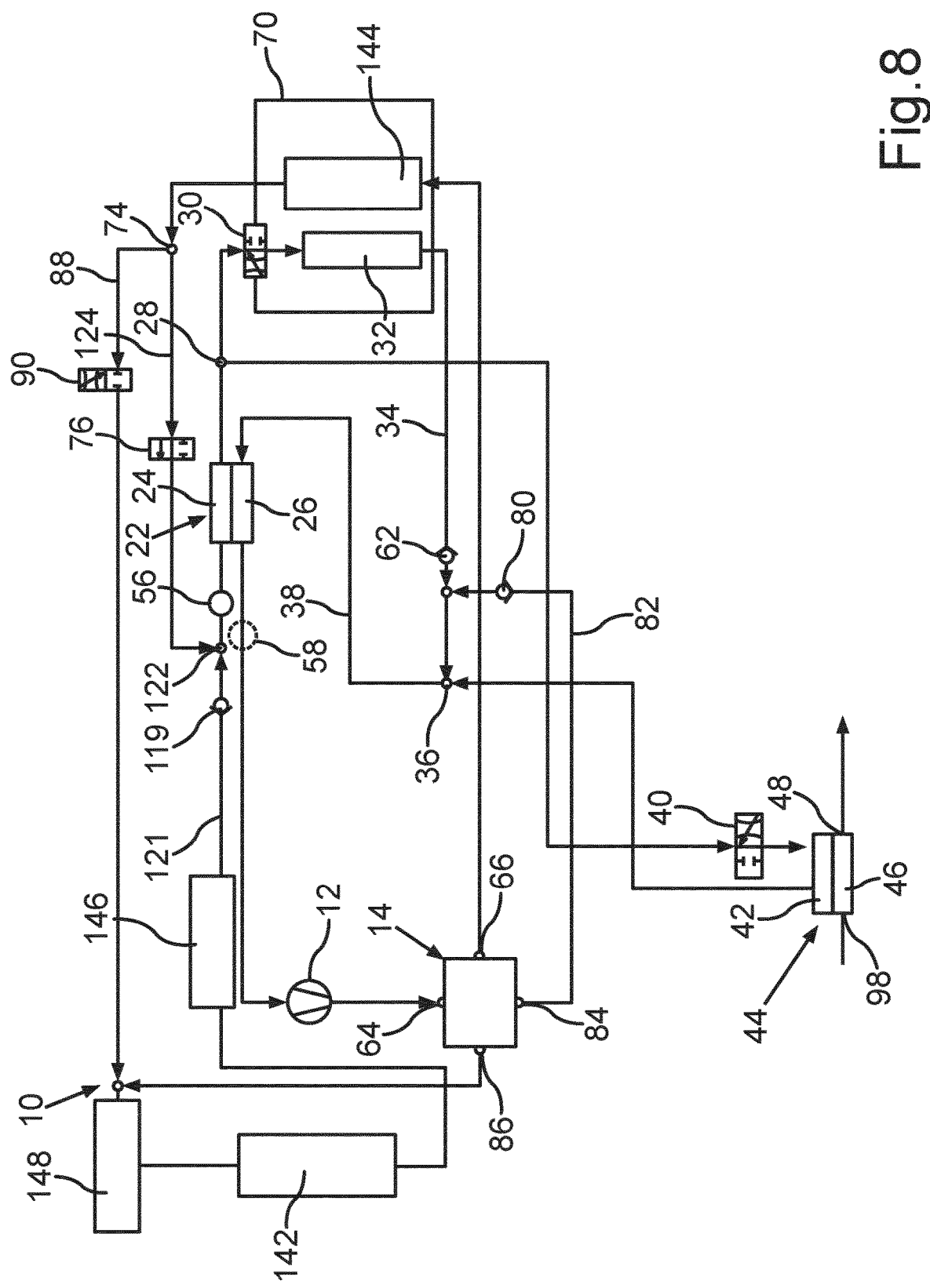
FIG. 8 shows a further variant of the refrigerant circuit according to FIG. 1, wherein the refrigerant circuit comprises at least one further heat exchanger through which coolant can flow, which can be integrated into the module assembly.

For example, the at least one heat exchanger 142 according to FIG. 8 can be provided instead of the condenser 16 which is cooled by means of the air flow or air-cooled. The heat exchanger 142 cooled using coolant or cooling water is preferably integrated into a coolant circuit (not shown here), which comprises a radiator arranged, for example, in the area of a front end of the motor vehicle. In such a radiator, the coolant can be cooled by the ambient air passing over the radiator. The heat exchanger 142 provided instead of the condenser 16 can be easily integrated into the module assembly 50. This is because there is no need for air to flow over the heat exchanger 142, as is the case with the air-cooled condenser 16.

In an analogous manner, the at least one further heat exchanger 144 can be provided instead of the heating register 68 shown in FIG. 1. This heat exchanger 144, which is water-cooled or cooled using coolant, can also be integrated well and easily into the module assembly 50. The cooling water heated by this heat exchanger 144 can be used, for example, to heat the electrical energy storage device of the motor vehicle.

Additionally or alternatively, the heat which is introduced into the coolant flowing through the heat exchanger 144 can be used to heat the air which is introduced into the passenger compartment of the motor vehicle. For this purpose, a further heat exchanger (not shown here) can also be integrated into the coolant circuit, in which the heat exchanger 144 shown in FIG. 8 and usable as a heating device is arranged or in which the heat exchanger 144 is integrated.

Additionally or alternatively, the additional heat exchanger 146 through which the coolant can flow can be arranged upstream of the air-cooled condenser 16 (cf. FIG. 1), as is schematically illustrated in FIG. 8. Furthermore, it is possible to arrange the at least one further heat exchanger 148 through which the coolant can flow downstream of the air-cooled condenser 16 (cf. FIG. 8 in conjunction with FIG. 1).

If such an indirect condenser in the form of the at least one heat exchanger 146, 148 is provided in addition to the air-cooled condenser 16, this is used in particular to increase performance with regard to cooling the refrigerant for the purpose of liquefying the refrigerant. At least one such heat exchanger 146, 148 provided in addition to the air-cooled condenser 16 can also be very advantageously integrated into the module assembly 50 or connected to the module assembly 50.

It is preferably provided that the module assembly 50 comprises at least the inner heat exchanger 22, the chiller 44, and the second expansion valve 40.

In particular, it can furthermore be provided that the module assembly 50 additionally comprises at least one of the check valves 62, 80 and/or the shut-off valve 76 and/or the further expansion valve 90.

In addition, as shown by way of example in FIG. 2, FIG. 3, and FIG. 4, the module assembly 50 can also comprise the collecting device 54, for example, in the form of the highpressure-side refrigerant collector 56 or the low-pressure-side accumulator 58 (cf. FIG. 1).

Additionally or alternatively, a further or third check valve 119 can be integrated into the module assembly 50. The third check valve 119 can, as shown schematically in FIG. 1, be arranged in a line branch 121 of the refrigerant circuit 10 leading from the condenser 16 to the high-pressure side 24 of the inner heat exchanger 22. In this case, the further or third check valve 119 is arranged upstream of a further or third branch point 122 of the refrigerant circuit 10.

At the third branch point 122, a line branch 124 of the refrigerant circuit 10, in which the shut-off valve 76 is arranged, and the line branch 121 are brought together. The check valve 119 prevents the refrigerant from flowing out via the line branch 121 to the condenser 16 in a heating mode of the refrigerant circuit 10, in which the shut-off valve 76 is open.

Furthermore, as shown in FIG. 4, the distribution device 14 can be integrated into the module assembly 50.

Figure 9:
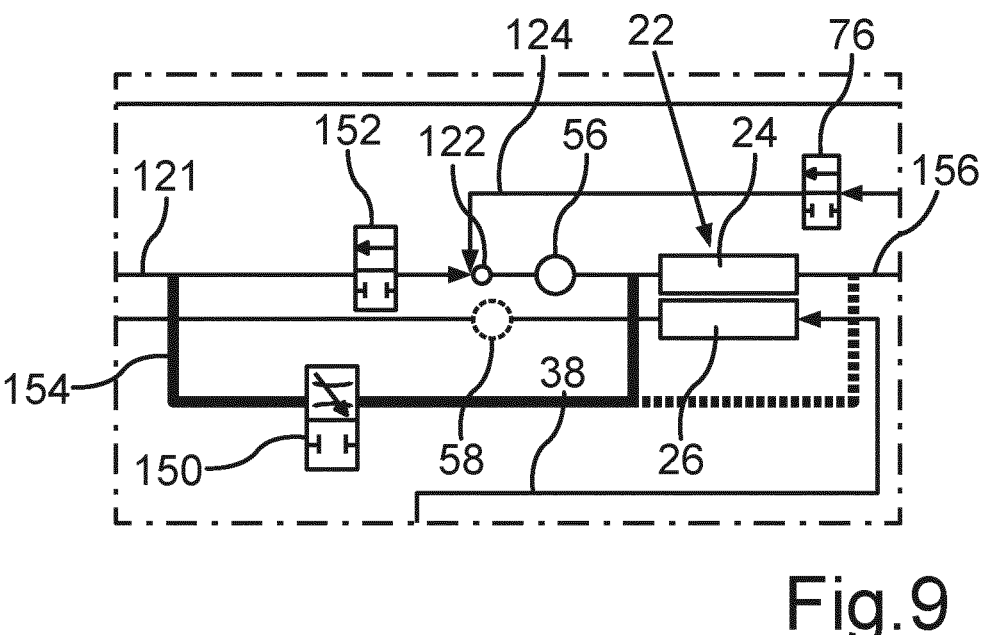
FIG. 9 shows a detail of a further variant of the refrigerant circuit, in which a further expansion valve belonging to the module assembly is provided, which makes it possible to use an air-cooled condenser of the refrigerant circuit as an evaporator.

With reference to FIG. 9, a further variant of the refrigerant circuit 10 or the module assembly 50 will be explained. Accordingly, the module assembly 50 can comprise a further or fourth expansion valve 150, by means of which the refrigerant coming from the heating register 68 in a heating mode can be expanded before the expanded refrigerant is supplied to the condenser 16. In this case, the condenser 16 over which or through which ambient air flows is operated as an evaporator, wherein the ambient air flow, which is illustrated by arrow 18 in FIG. 1, is used as a heat source.

In contrast to the variant according to FIG. 1, in this case the check valve 119 is not provided in the line branch 121, but rather a further shut-off valve 152 or switching valve. This shut-off valve 152 can also be integrated into the module assembly 50. When the shut-off valve 152 is closed, the refrigerant coming from the heating register 68 passes via the branch point 122 and, for example, the high-pressure side refrigerant collector 56 into a line branch 154 in which the fourth expansion valve 150 is arranged.

The line branch 154 having the fourth expansion valve 150 opens again into the line branch 121 connected to the condenser 16. Via this line branch 121, the refrigerant expanded by means of the fourth expansion valve 150 thus reaches the condenser 16 (cf. FIG. 1), which is operated as an evaporator in this mode of operation of the refrigerant circuit 10.

From the condenser 16, the refrigerant passes into the valve device 14 via the third outlet 86 of the valve device 14, which is used as an inlet in this mode of operation, and via the second outlet 84 and the check valve 80 to the low-pressure side 26 of the inner heat exchanger 22. The refrigerant leaving the low-pressure side 26 is then supplied back to the compressor 12.

According to a first variant shown in FIG. 9, the line branch 154 branches off upstream of the high-pressure side 24 from a line branch 156, in which the high-pressure side 24 of the inner heat exchanger 22 is integrated. In this variant, the high-pressure side 24 of the inner heat exchanger 22 is accordingly bypassed and the refrigerant supplied to the condenser 16 is therefore less undercooled than would be the case if it flowed through the high-pressure side 24 of the inner heat exchanger 22.

In a further variant shown in FIG. 9, the line branch 154 branches off from the line branch 156 downstream of the high-pressure side 24 of the inner heat exchanger 22. Then, the refrigerant supplied to the fourth expansion valve 40 is undercooled more. This can be advantageous with regard to further heat absorption from the ambient air flow.

When using the fourth expansion valve 150 integrated into the line branch 154 to expand the refrigerant supplied to the condenser 16, an air heat pump mode of the refrigerant circuit 10 is implementable, in which the ambient air is used as a heat source.

Figure 10:
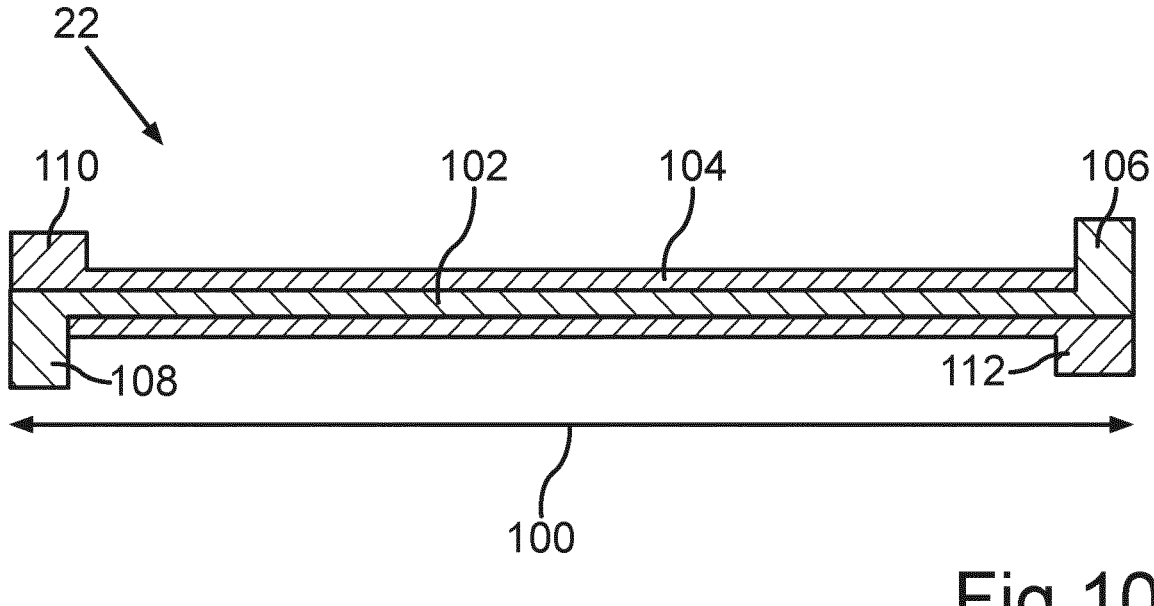
FIG. 10 shows a schematic sectional view of a possible embodiment of the inner heat exchanger, in which it comprises two coaxially arranged tubes.

A possible embodiment of the inner heat exchanger 22 is shown very schematically in FIG. 10. In this case, the inner heat exchanger 22 has a very high ratio of a length 100 to a width and height or a diameter of the inner heat exchanger 22. For example, according to FIG. 10, the inner heat exchanger 22 can be designed in the manner of a coaxial tube heat exchanger, which comprises a first tube 102 that is arranged within a second tube 104.

One of the two tubes 102, 104, for example the second tube 104, can be associated here with the high-pressure side 24 of the inner heat exchanger 22. Then the other of the two tubes 102, 104, i.e., the first tube 102, is associated with the low-pressure side 26 of the inner heat exchanger 22. Accordingly, in the present case the first tube has a low-pressure side flow line 106, at which the refrigerant flows into the low-pressure side 26 of the inner heat exchanger 22.

On the opposite side in the direction of the length 100 of the inner heat exchanger 22, the first tube 102 of the inner heat exchanger 22 has a return line 108, from which the refrigerant reaches the compressor 12 (cf. FIG. 1). In an analogous manner, the second tube 104 associated with the high-pressure side 24 has a flow line 110, which is arranged in the area of the low-pressure side return line 108 with respect to the length 100. And the second tube 104 also has a return line 112 on the high-pressure side, on which the refrigerant leaves the high-pressure side 24 of the inner heat exchanger 22 (cf. FIG. 1). The high-pressure side return line 112 is arranged in the area of the low-pressure side flow line 106 in relation to the length 100 of the inner heat exchanger 22.

Such an inner heat exchanger 22, designed essentially in the manner of a coaxial tube, is usable advantageously in particular when the refrigerant circuit 10 is integrated into a motor vehicle having an internal combustion engine. Because then there is a comparatively large installation space between the condenser 16 (cf. FIG. 1), which is usually arranged in the area of a front end or front area of the motor vehicle, and the air conditioning unit 70 for accommodating the inner heat exchanger 22, which has the comparatively long length 100.

Figures 11, 12:
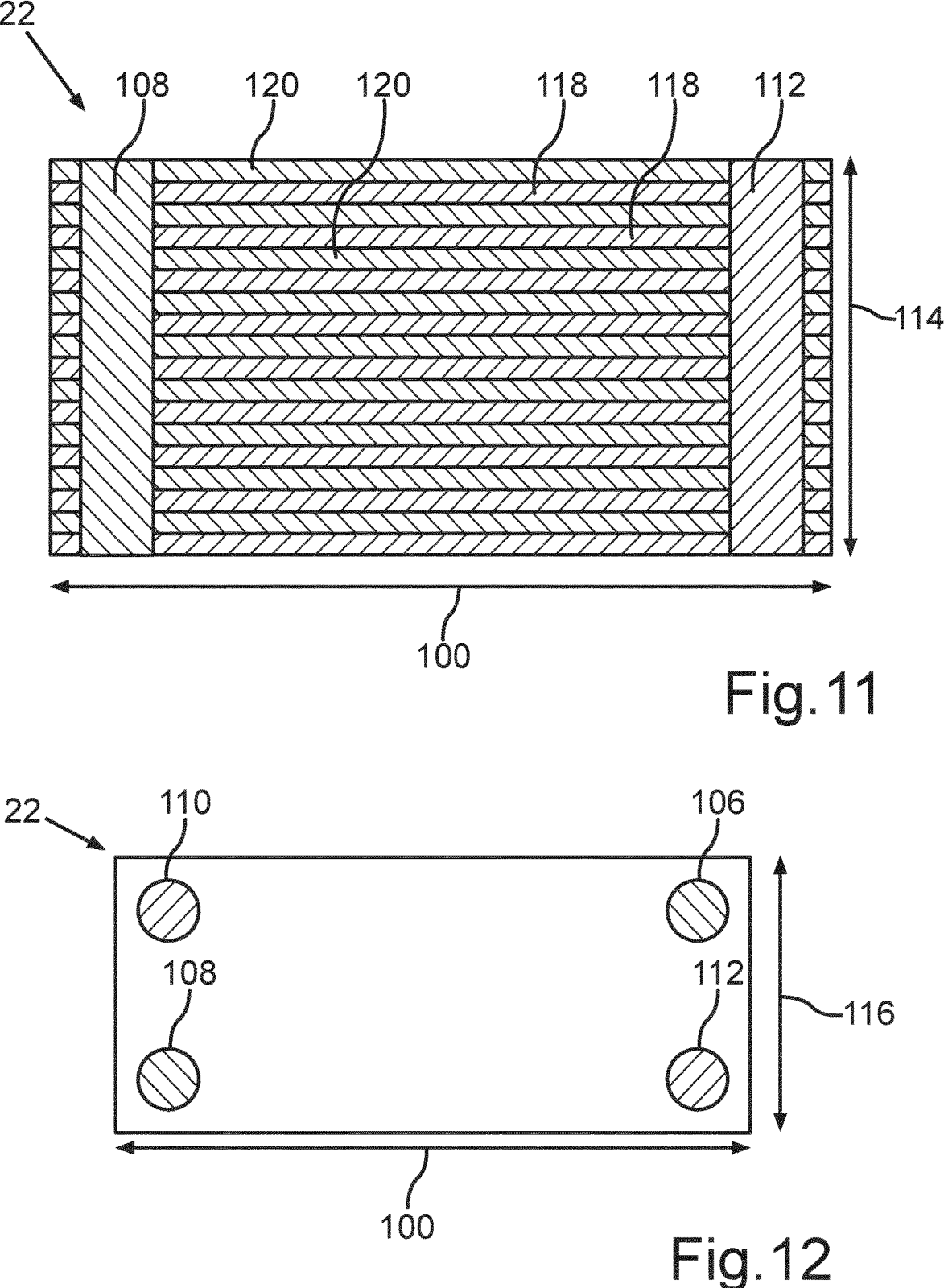
FIG. 11 shows a schematic sectional view of a variant of the inner heat exchanger, in which it is designed as a plate heat exchanger.
FIG. 12 schematically shows the plate heat exchanger according to FIG. 11 in a top view.

According to FIG. 11, the inner heat exchanger 22 can advantageously also be designed as a plate heat exchanger, in which the ratio of the length 100 to a height 114 and the ratio of the length 100 to a width 116 (cf. FIG. 12) of the plate heat exchanger is low. The inner heat exchanger 22 designed as a plate heat exchanger is therefore very advantageously integratable into a compact and usually highly branched refrigerant circuit 10 of a motor vehicle designed as an electric vehicle or hybrid vehicle. Furthermore, with such a plate heat exchanger the transferable heat output is very high and there is a correspondingly high degree of exchange.

According to FIG. 11, the plate heat exchanger comprises a plurality of high-pressure side plates 118 and a plurality of low-pressure side plates 120 which are stacked on one another. In FIG. 11, for reasons of clarity, only some of the high-pressure side plates 118 and some of the low-pressure side plates 120 are provided with a reference number.

From the top view of the plate heat exchanger according to FIG. 12, it is apparent that the high-pressure side flow line 110 and the low-pressure side return line 108 (according to the illustration in FIG. 10) can be arranged in a first end area or edge area of the plate heat exchanger with respect to the length 100. In contrast, the low-pressure-side flow line 106 and the high-pressure-side return line 112 can be arranged in an opposite end area or edge area of the plate heat exchanger.

Figure 13:
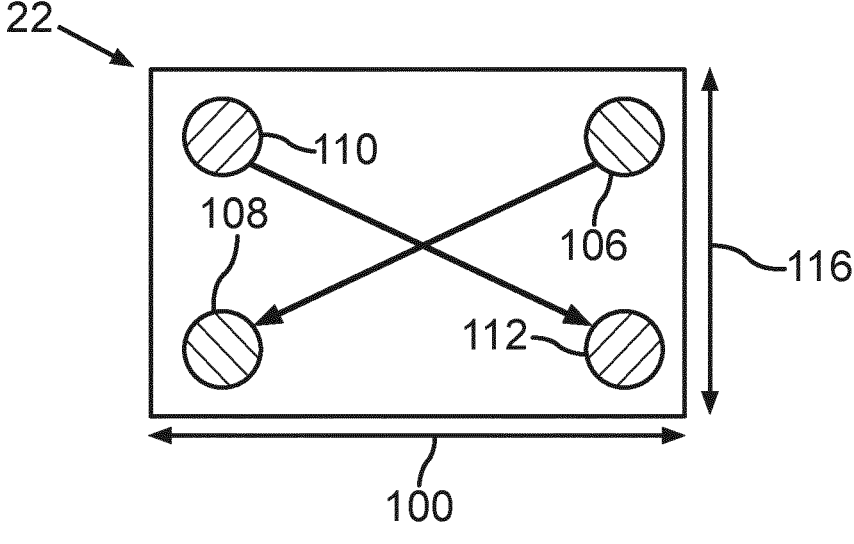
FIG. 13 schematically shows the design of the plate heat exchanger as a countercurrent heat exchanger.

According to the embodiment shown in FIG. 13, the plate heat exchanger can be designed as a countercurrent heat exchanger. Accordingly, the flow directed from the high-pressure side flow line 110 to the high-pressure side return line 112 and the flow directed from the low-pressure side flow line 106 to the low-pressure return line 108 are opposite to one another.

Figure 14:
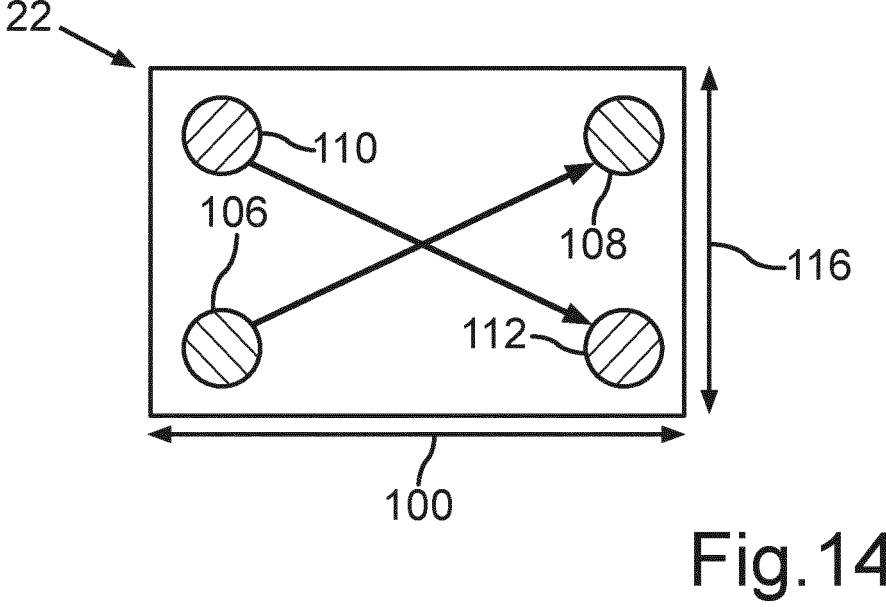
FIG. 14 schematically shows the design of the plate heat exchanger as a cocurrent heat exchanger.

In contrast, the inner heat exchanger 22 shown in FIG. 14 and designed as a plate heat exchanger is designed as a cocurrent heat exchanger. Consequently, the high-pressure side flow line 110 and the low-pressure side flow line 106 are arranged in the direction of the length 100 in a first edge area of the inner heat exchanger 22. And both the low-pressure-side return line 108 and the high-pressure-side return line 112 are arranged in the edge area of the plate heat exchanger opposite in the direction of the length 100.

Figure 15:
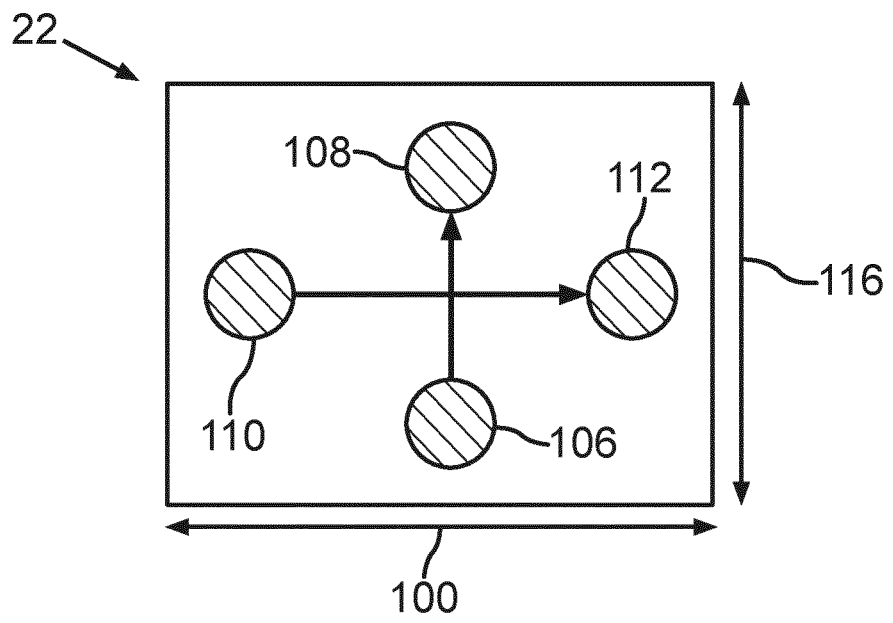
FIG. 15 shows schematically the design of the plate heat exchanger as a crosscurrent heat exchanger.

In the embodiment of the plate heat exchanger shown in FIG. 15, by which the inner heat exchanger 22 is provided, the plate heat exchanger is designed as a crosscurrent heat exchanger. Here, the high-pressure-side flow line 110 and the high-pressure-side return line 112 lie opposite to one another, for example in the direction of the length 100. In contrast, the low-pressure-side flow line 106 and the low-pressure-side return line 108 lie opposite to one another, for example in the direction of the width 116 of the plate heat exchanger.

Combinations of the flow directions shown schematically in FIG. 13 to FIG. 15 can also be present in the inner heat exchanger 22 designed as a plate heat exchanger.

Overall, the examples show how the module assembly 50 can provide a highly integrated, compact inner heat exchanger 22, in particular as a parts carrier.

The invention claimed is:

1. A module assembly for a refrigerant circuit of a motor vehicle, comprising:
   an inner heat exchanger, which is configured to transfer heat in a refrigerant configured to be compressed by operating a compressor of the refrigerant circuit, from a high-pressure side of the inner heat exchanger to a low-pressure side of the inner heat exchanger,
   a heat exchanger configured for flow of a coolant that is subjected to the refrigerant being configured to be supplied from the high pressure side of the inner heat exchanger to the heat exchanger and configured to be expanded by an expansion device of the module assembly, wherein the module assembly is formed separately from an evaporator of the refrigerant circuit and a condenser of the refrigerant circuit,
   a support device separate from the heat exchanger; and configured to hold the heat exchanger,
   at least one expansion valve that is configured, in a heating mode, to reduce a pressure of the refrigerant supplied to the condenser of the refrigerant circuit, and
   a shut-off valve that is configured, in the heating mode, to either:
   subject the condenser of the refrigerant circuit to refrigerant when closed, and
   subject the high-pressure side of the inner heat exchanger to refrigerant while bypassing the condenser of the refrigerant circuit when open.

2. The module assembly according to claim 1, wherein the support device is formed by the inner heat exchanger as two extruded profiles connected to one another.

3. The module assembly according to claim 1, wherein the support device is a plate-shaped component of the module assembly that is separate from the inner heat exchanger.

4. The module assembly according to claim 3, wherein the plate-shaped component in an installed position of the module assembly has an upper side and a lower side facing away from the upper side, the inner heat exchanger is arranged on the lower side, and the heat exchanger is arranged on a lower side of the inner heat exchanger.

5. The module assembly according to claim 4, wherein a distribution device and two check valves are arranged on the upper side of the plate-shaped component.

6. The module assembly according to claim 1, further comprising:
   at least one collecting device which is configured to store refrigerant, wherein the collecting device is held on the support device.

7. The module assembly according to claim 1, further comprising:
   a check valve, configured, in the heating mode, to prevent the refrigerant from flowing out of the high-pressure side of the inner heat exchanger toward the condenser.

8. The module assembly according to claim 1, wherein the module assembly comprises a plurality of expansion valves including the at least one expansion valve.

9. The module assembly according to claim 1, wherein the at least one expansion valve is configured to expand the refrigerant to such an extent that the condenser is usable as an evaporator, by which heat can be extracted from an ambient air flow that can be supplied to the condenser.

10. The module assembly according to claim 1, further comprising:
   a distribution device, by which, during operation of the refrigerant circuit, refrigerant compressed by the compressor can be supplied starting from the distribution device either first to the condenser or first to a heating device of the refrigerant circuit.

11. The module assembly according to claim 1, further comprising:
   at least one bypass line, via which refrigerant can be supplied to the heat exchanger through which the coolant can flow, while bypassing the high-pressure side of the inner heat exchanger.

12. The module assembly according to claim 1, further comprising:
   at least one further heat exchanger through which a coolant can flow and which can be subjected to the refrigerant compressed by the compressor during operation of the refrigerant circuit.

13. The module assembly according to claim 1, wherein the inner heat exchanger comprises a first tube which is arranged within a second tube, wherein the first tube is coupled to the high-pressure side of the inner heat exchanger, the second tube is coupled to the low-pressure side of the inner heat exchanger, the first tube has both a first flow line and a first return line, and the second tube has both a second flow line and a second return line.

14. The module assembly according to claim 1, wherein the inner heat exchanger is a plate heat exchanger having a plurality of high-pressure side plates and a plurality of low-pressure side plates which are stacked on one another.

15. A refrigerant circuit for a motor vehicle, wherein the refrigerant circuit has the module assembly according to claim 1.

16. The module assembly according to claim 3, further comprising:

at least one collecting device which is configured to store refrigerant, wherein the at least one collecting device is held on the support device and/or supported by the support device.

17. The module assembly according to claim 4, further comprising:

at least one collecting device configured to store refrigerant, wherein the at least one collecting device is held on the support device and/or supported by the support device.

18. The module assembly according to claim 5, further comprising at least one collecting device configured to store refrigerant, wherein the collecting device is held on the support device and/or supported by the support device.

19. The module assembly according to claim 1, further comprising:

at least one check valve configured, in a suction mode, to prevent the refrigerant from flowing back into the evaporator from the condenser.

20. The module assembly of claim 1, wherein the shut-off valve is further configured, in a reheat mode, to supply the refrigerant to the evaporator via the high-pressure side of the inner heat exchanger while bypassing the condenser.

21. A module assembly for a refrigerant circuit of a motor vehicle, comprising:

an inner heat exchanger, which is configured to transfer heat in a refrigerant configured to be compressed by operating a compressor of the refrigerant circuit, from a high-pressure side of the inner heat exchanger to a low-pressure side of the inner heat exchanger, a heat exchanger configured for flow of a coolant that is subjected to the refrigerant being configured to be supplied from the high pressure side of the inner heat exchanger to the heat exchanger and configured to be expanded by an expansion device of the module assembly, wherein the module assembly is formed separately from an evaporator of the refrigerant circuit and a condenser of the refrigerant circuit, a support device separate from the heat exchanger and on which the heat exchanger is held, wherein the support device is formed by the inner heat exchanger, at least one expansion valve that is configured, in a heating mode, to reduce a pressure of the refrigerant supplied to the condenser of the refrigerant circuit, the module assembly further comprising a collecting device which is configured to store refrigerant, wherein the collecting device is attached to the inner heat exchanger, wherein the heat exchanger is configured as a chiller, the chiller having a coolant side through which the coolant flows during operation of the chiller, wherein the chiller is supported by the inner heat exchanger, the module assembly further comprising a first check valve, wherein the first check valve is configured to prevent refrigerant from flowing back into the evaporator when refrigerant is extracted from the evaporator in a suction mode of the refrigerant circuit, the module assembly further comprising a second check valve, wherein the second check valve is configured to prevent refrigerant extracted from the condenser from being able to flow back into the condenser during a heat pump mode of the refrigerant circuit, the module assembly further comprising a shut-off valve, wherein the inner heat exchanger is configured to support the shut-off valve, the module assembly further comprising a further carrier part configured to attach the at least one expansion valve, wherein the further carrier part is arranged on the shut-off valve, and wherein the shut-off valve is configured, in the heating mode, to either:

subject the condenser of the refrigerant circuit to refrigerant when closed, and subject the high-pressure side of the inner heat exchanger to refrigerant while bypassing the condenser of the refrigerant circuit when open.

* * * * *